US009655159B2

(12) United States Patent
Paladugu et al.

(10) Patent No.: US 9,655,159 B2
(45) Date of Patent: May 16, 2017

(54) MANAGING GUARANTEED BIT RATE QUALITY OF SERVICE RESOURCE ALLOCATION BASED ON GUARANTEED BIT RATE DATA ACTIVITY ON A LINK

(71) Applicant: QUALCOMM Incorporated, San Diego, CA (US)

(72) Inventors: Karthika Paladugu, San Diego, CA (US); Kirankumar Anchan, San Diego, CA (US); Arvind V. Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/012,964

(22) Filed: Aug. 28, 2013

(65) Prior Publication Data

US 2014/0064124 A1 Mar. 6, 2014

Related U.S. Application Data

(60) Provisional application No. 61/695,707, filed on Aug. 31, 2012.

(51) Int. Cl.
*H04W 72/02* (2009.01)
*H04W 76/02* (2009.01)
*H04W 76/04* (2009.01)

(52) U.S. Cl.
CPC ........ *H04W 76/028* (2013.01); *H04W 76/046* (2013.01)

(58) Field of Classification Search
None
See application file for complete search history.

(56) References Cited

U.S. PATENT DOCUMENTS

| 2007/0259673 | A1* | 11/2007 | Willars et al. | 455/453 |
| 2008/0232306 | A1* | 9/2008 | Kopplin et al. | 370/328 |

(Continued)

FOREIGN PATENT DOCUMENTS

| WO | 2006115624 A2 | 11/2006 |
| WO | 2009057045 A2 | 5/2009 |

(Continued)

OTHER PUBLICATIONS

MalafayaBot et al. "Definition of Attempt" Wictionary, Jul. 26, 2012.*

(Continued)

*Primary Examiner* — Robert M Morlan
(74) *Attorney, Agent, or Firm* — Muncy, Geissler, Olds & Lowe, P.C.

(57) ABSTRACT

In an embodiment, an apparatus (e.g., a client device, an eNodeB, MME, S-GW, P-GW, UTRAN component, etc.) detects a first transition of a client device from an active state to an idle state while the client device is allocated a Quality of Service (QoS) link by a serving network. The apparatus caches QoS information associated with the QoS link, and releases the QoS link in response to the detection of the first transition. The apparatus later detects, after the caching and releasing, a second transition of the client device from the idle state back to the active state. The apparatus re-establishes the QoS link in response to the detection of the second transition using the cached QoS information.

40 Claims, 20 Drawing Sheets

(56) References Cited

U.S. PATENT DOCUMENTS

| | | |
|---|---|---|
| 2012/0042058 A1* | 2/2012 | Shaikh et al. ............... 709/222 |
| 2012/0069817 A1* | 3/2012 | Ling et al. .................. 370/331 |
| 2012/0120828 A1 | 5/2012 | Anderson et al. |
| 2012/0218892 A1* | 8/2012 | Kotecha et al. ............. 370/235 |
| 2012/0307668 A1* | 12/2012 | Wiemann et al. ........... 370/252 |
| 2013/0016658 A1* | 1/2013 | Lovsen ............... H04W 76/028 370/328 |
| 2013/0039339 A1* | 2/2013 | Rayavarapu et al. ........ 370/331 |
| 2013/0051326 A1 | 2/2013 | Jeyatharan et al. |
| 2013/0083775 A1 | 4/2013 | Sun et al. |
| 2013/0223222 A1* | 8/2013 | Kotecha et al. ............. 370/235 |

FOREIGN PATENT DOCUMENTS

| | | |
|---|---|---|
| WO | 2012023048 A1 | 2/2012 |
| WO | 2012034580 A1 | 3/2012 |

OTHER PUBLICATIONS

International Search Report and Written Opinion—PCT/US2013/057402—ISAEPO—Dec. 18, 2013.

Nokia et al., "Preservation of EPS Bearers and MME Context Parameters," 3GPP Draft; S2-072747 MME Bearer Context, 3rd Generation Partnership Project (3GPP), Mobile Competence Centre, 650, Route Des Lucioles; F-06921 Sophia-Anti Poliscedex, France, vol. SA WG2, No. Orlando; Jun. 19, 2007, Jun. 19, 2007 (Jun. 19, 2007), pp. 1-4, XP050260281.

* cited by examiner

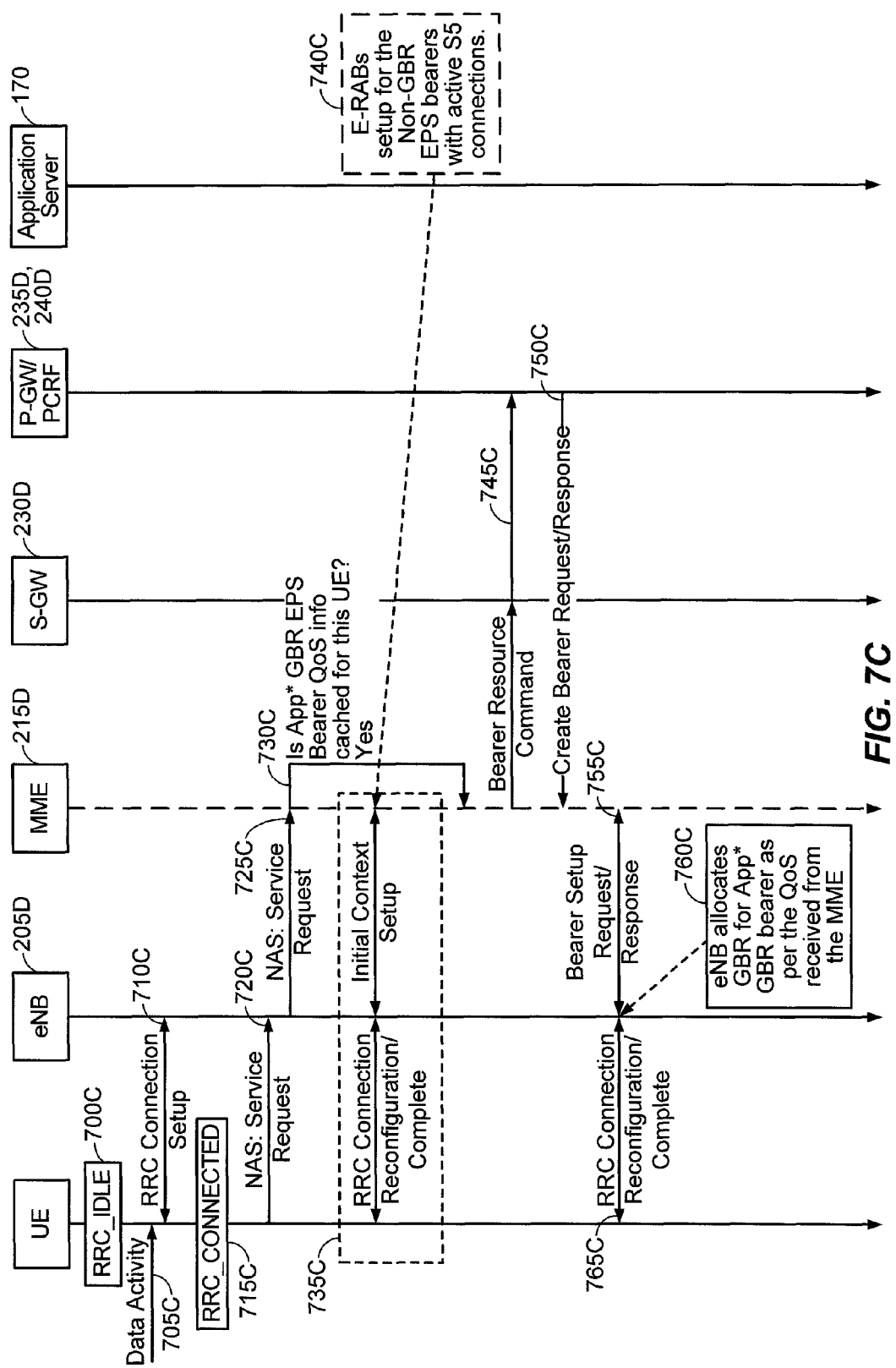

MANAGING GUARANTEED BIT RATE QUALITY OF SERVICE RESOURCE ALLOCATION BASED ON GUARANTEED BIT RATE DATA ACTIVITY ON A LINK

CLAIM OF PRIORITY UNDER 35 U.S.C. §119

The present Application for Patent claims priority to Provisional Application No. 61/695,707, entitled "MANAGING GUARANTEED BIT RATE QUALITY OF SERVICE RESOURCE ALLOCATION BASED ON GUARANTEED BIT RATE BEARER DATA ACTIVITY", filed Aug. 31, 2012, by the same inventors as the subject application, assigned to the assignee hereof and hereby expressly incorporated by reference herein in its entirety.

BACKGROUND OF THE INVENTION

1. Field of the Invention

Embodiments of the invention relate to managing guaranteed bit rate (GBR) Quality of Service (QoS) resource allocation based on GBR data activity on a link.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

In an embodiment, an apparatus (e.g., a client device, an eNodeB, MME, S-GW, P-GW, UTRAN component, etc.) detects a first transition of a client device from an active state to an idle state while the client device is allocated a Quality of Service (QoS) link by a serving network. The apparatus caches QoS information associated with the QoS link, and releases the QoS link in response to the detection of the first transition. The apparatus later detects, after the caching and releasing, a second transition of the client device from the idle state back to the active state. The apparatus re-establishes the QoS link in response to the detection of the second transition using the cached QoS information.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 7C illustrates a network-side solution for re-establishing an application-specific GBR EPS media bearer in accordance with an embodiment of the invention.

DETAILED DESCRIPTION

Figure 1:
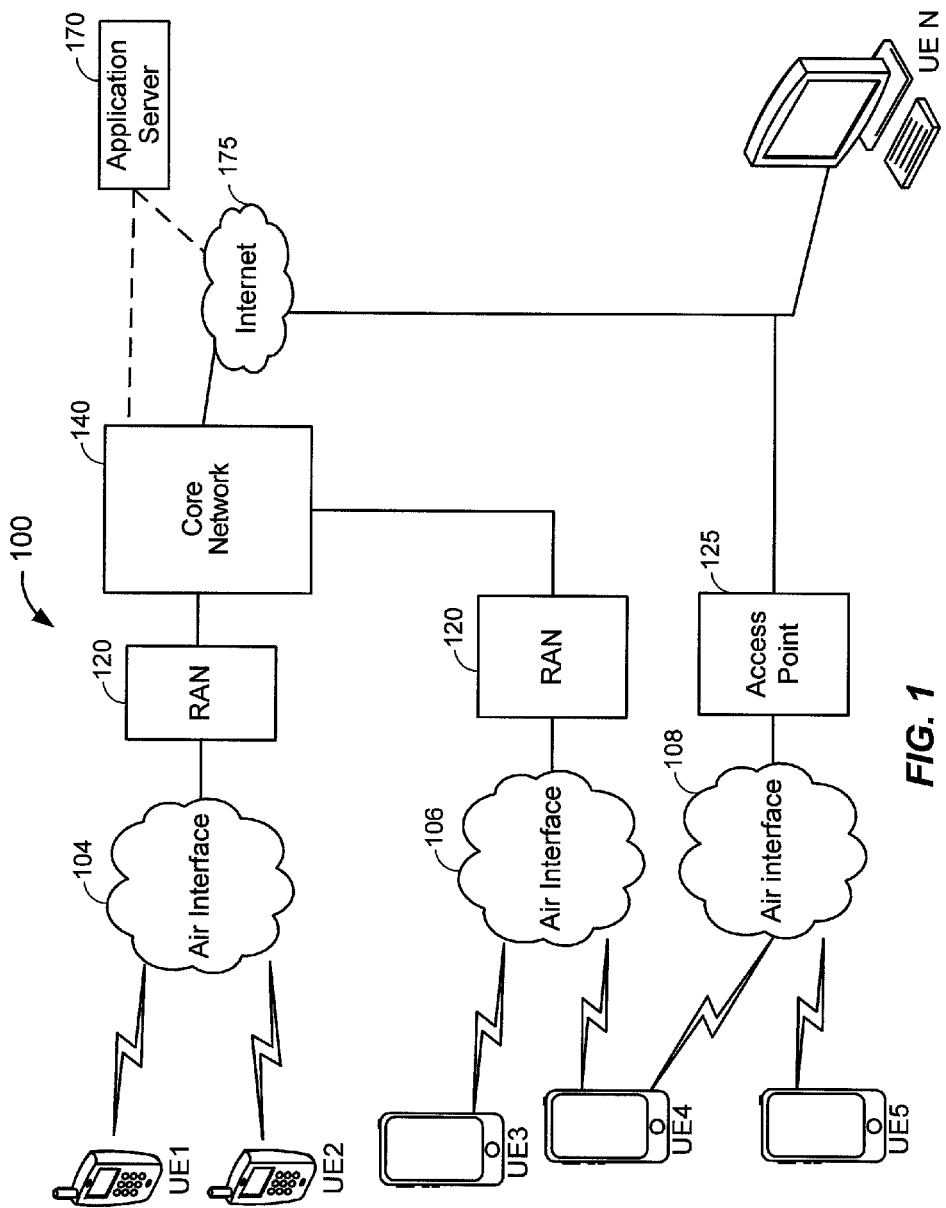
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over- Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
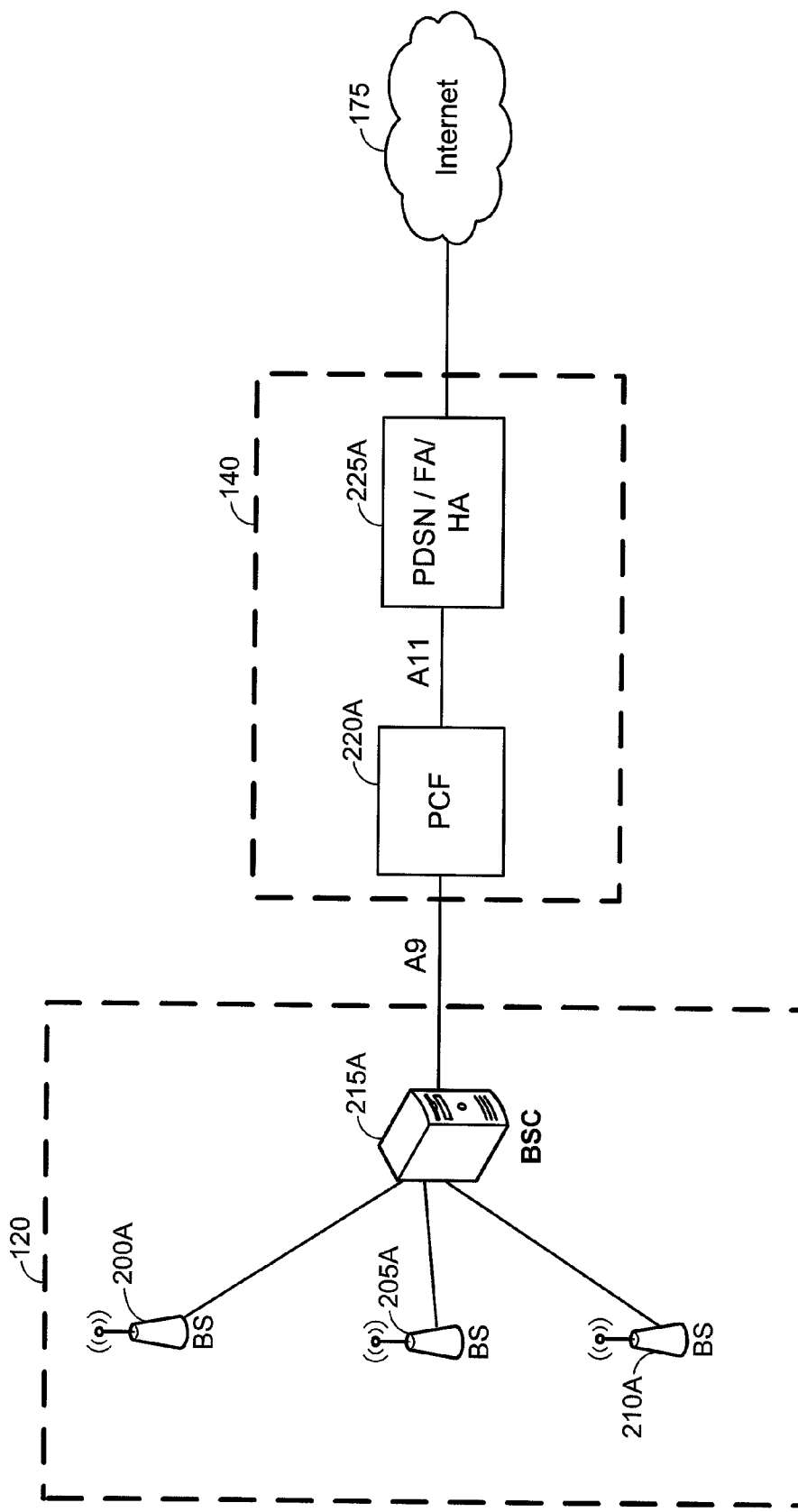
FIG. 2A illustrates an example configuration of a radio access network (RAN) and a packet-switched portion of a core network for a 1× EV-DO network in accordance with an embodiment of the invention.

FIG. 2A illustrates an example configuration of the RAN 120 and the core network 140 for packet-switched communications in a CDMA2000 1x Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
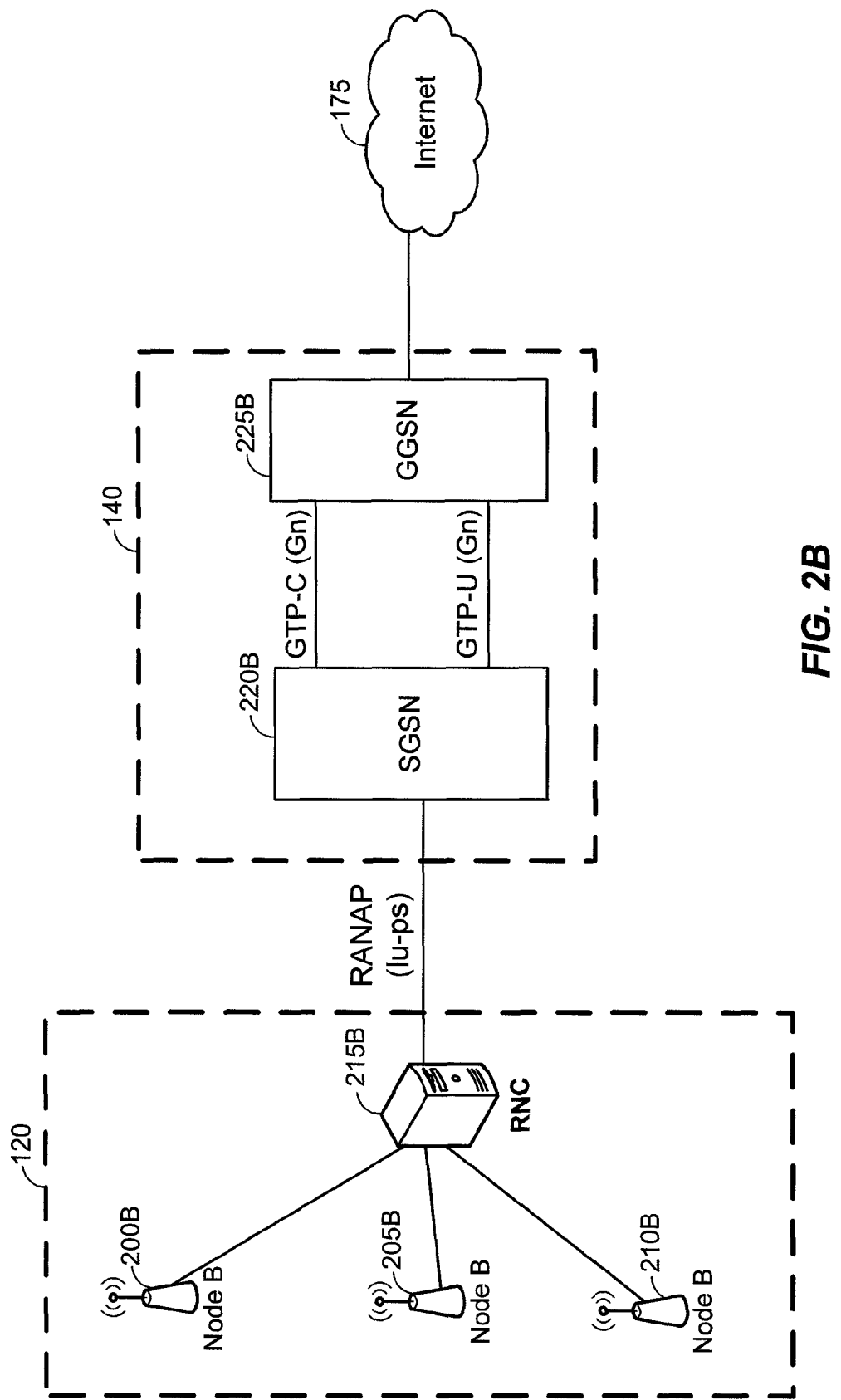
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1x EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UMTS Terrestrial Radio Access Network (UTRAN), in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
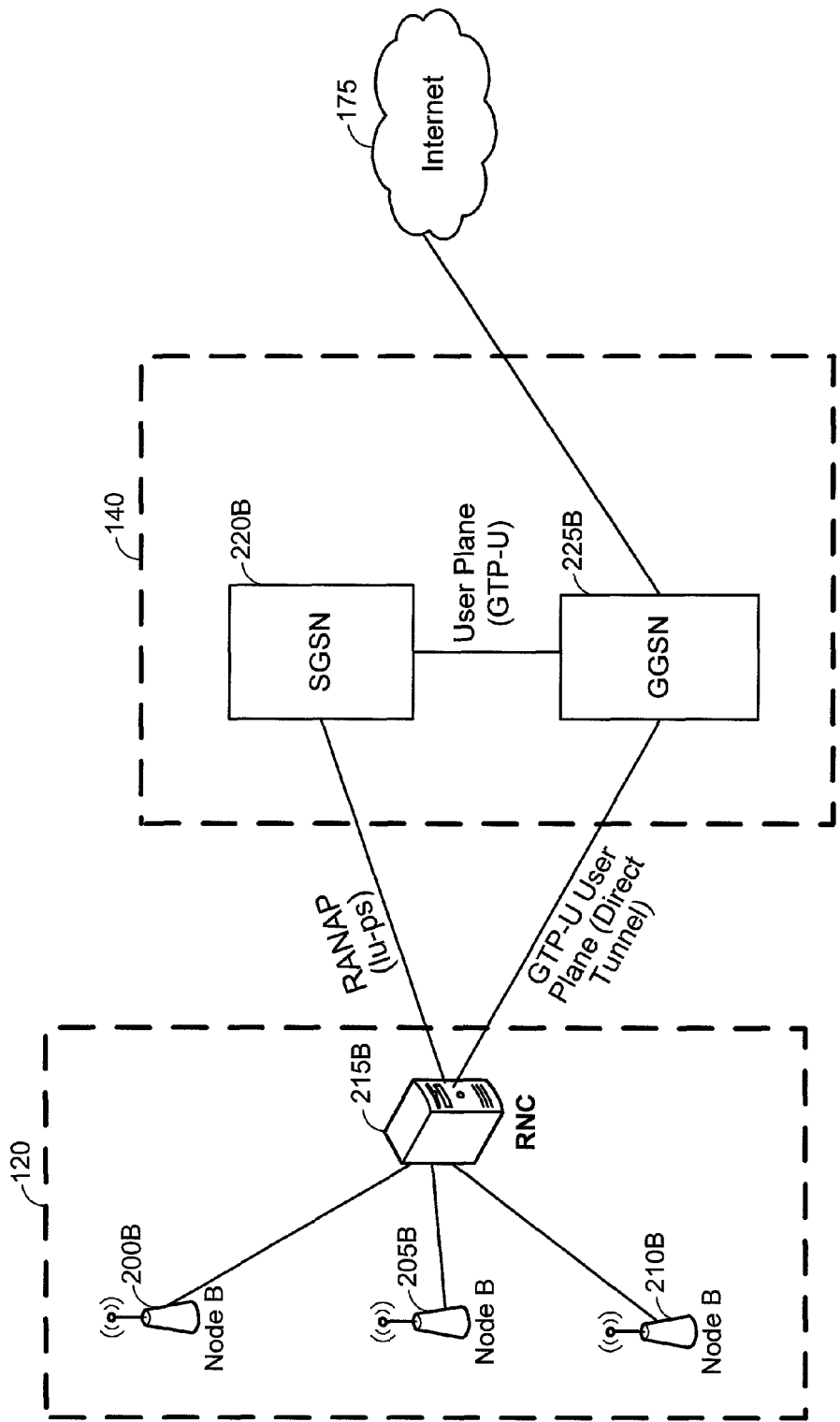
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
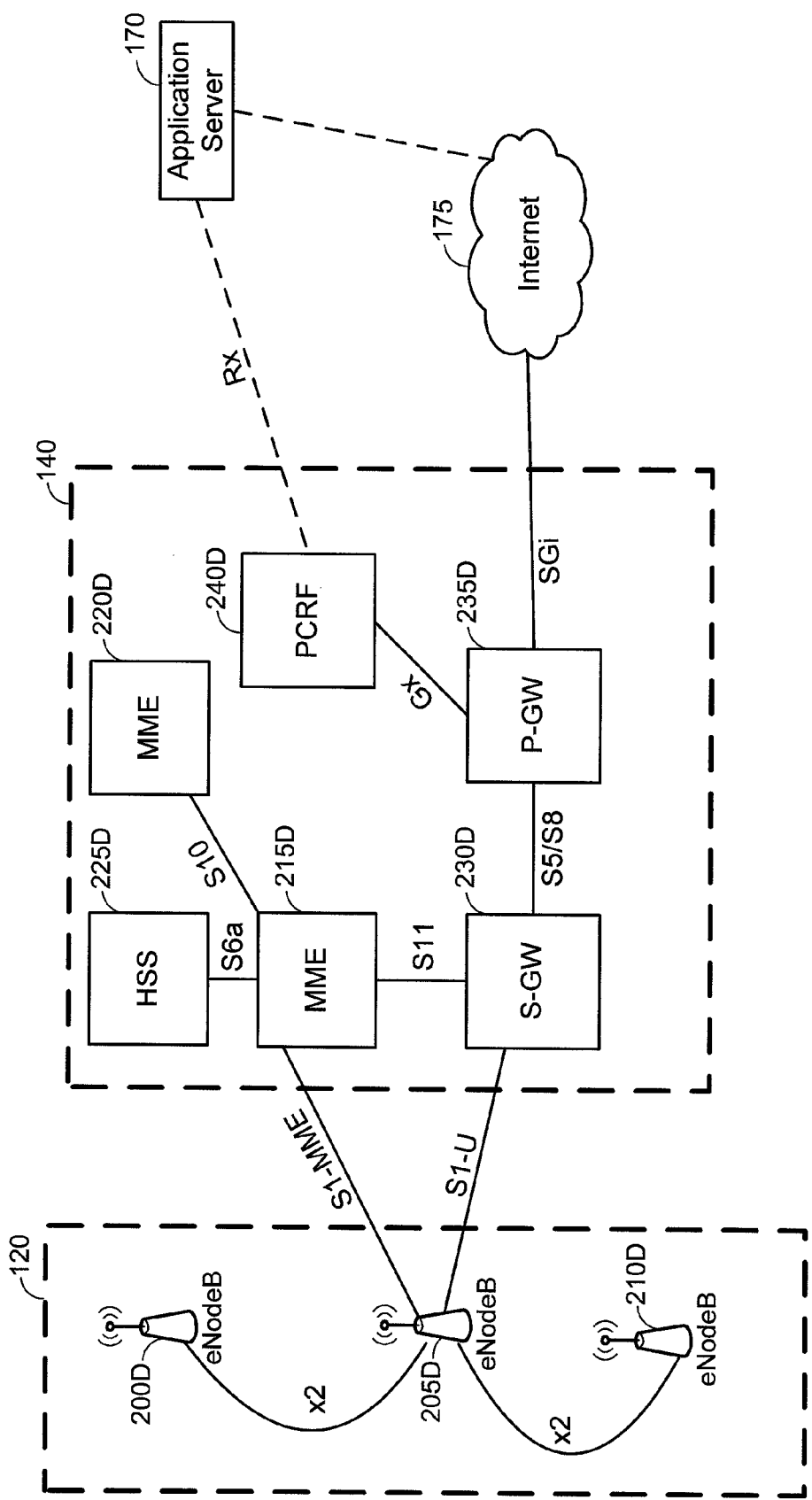
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
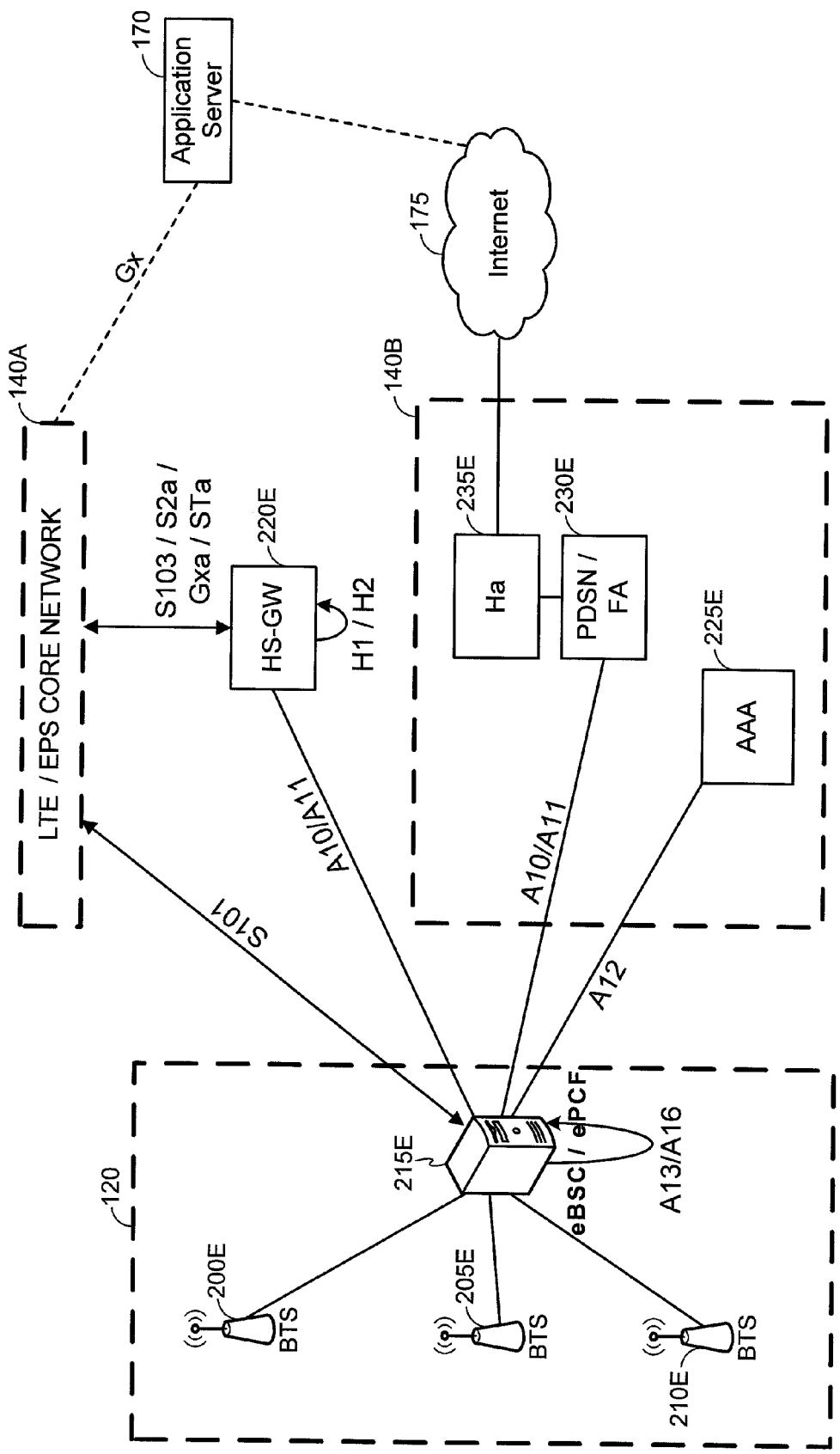
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
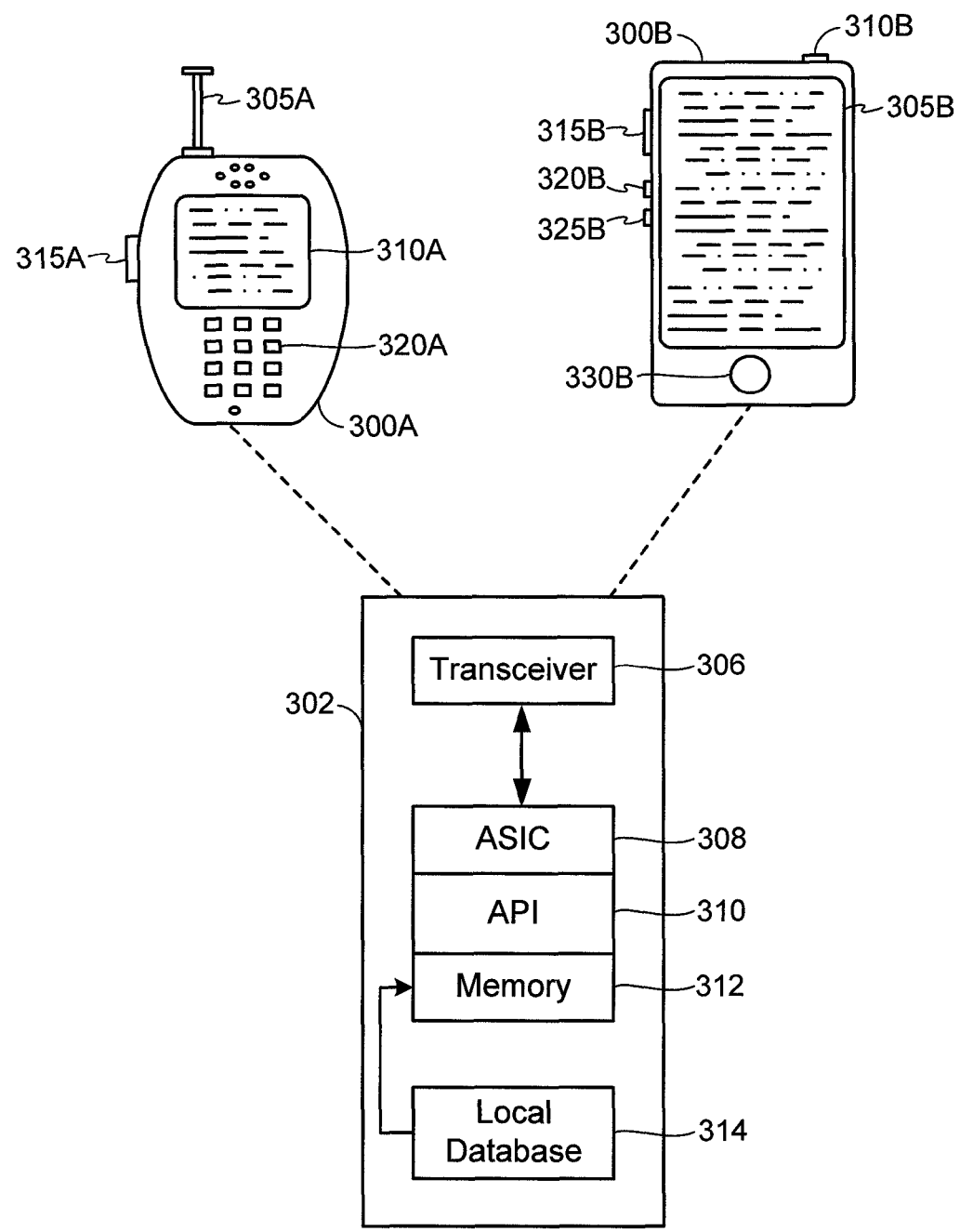
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
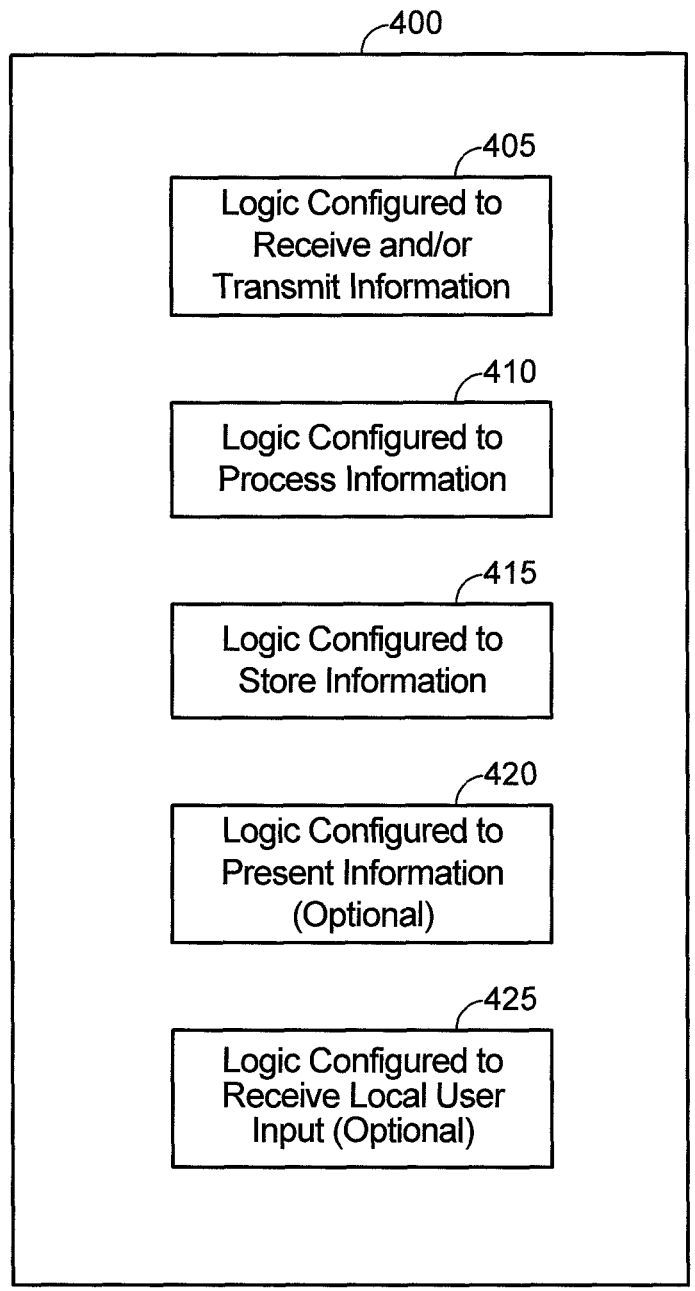
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Sessions that operate over networks such as 1× EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or setup) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions.

Conventionally, when a QoS bearer is setup or activated to support a UE's participation a communication session associated with a particular service (e.g., VoIP, PTT, etc.), QoS is setup for the entire duration of the communication session. When the communication session is over, the UE returns to an idle state and the QoS bearer is released.

For example, in LTE, the LTE core network maintains the S5 connection between the S-GW 230D and P-GW 240D for default EPS bearers (i.e., EPS bearers that are not allocated GBR QoS) corresponding to each PDN connection in an 'Always On' state, such that the non-GBR QoS EPS bearer is maintained (not released) when the UE transitions from an RRC-Connected state to an RRC-Idle state. The reason for this is that maintaining default EPS Bearer in active state does not impact the capacity of the LTE core network. However, for QoS bearers with GBR ("GBR QoS bearers", or "GBR EPS bearers" if specifically in LTE), LTE core networks typically release the S5 connections when an associated UE is determined to transition from the RRC-Connected state to the RRC-Idle state to conserve resources, because maintaining the S5 connections for GBR EPS bearers consumes core network resources which limit the capacity of the LTE core network.

Certain delay-sensitive communication sessions, such as App* calls (e.g., delay-sensitive PTT calls, sensitive-VoIP calls, etc.), require the GBR QoS bearer to be brought up quickly during call setup. However, as noted above, there is no GBR QoS bearer context maintained in RRC-Idle state for LTE. As an example, Voice Over LTE (VoLTE) is based upon this assumption. Thus, the GBR QoS bearers for a delay-sensitive communication session are typically setup on demand by the application server 170 during setup of the session. One option for decreasing the call setup delays associated with GBR QoS bearer setup when a UE is transitioning from RRC-Idle state to RRC-Connected state is to maintain the S5 connection between the S-GW 230D and P-GW 240D for the GBR QoS bearer even when the UE is in RRC-Idle state. As noted above, this can significantly impact resource consumption by the LTE network.

Accordingly, embodiments are directed to a procedure for more quickly establishing an S5 connection for GBR QoS bearers for particular application types during an RRC Idle-to-Connected transition without requiring the S5 connection to be maintained when an associated UE is in RRC-Idle state. In the embodiments described below, information associated with the GBR QoS bearers for certain application types (e.g., applications associated with delay-sensitive communication sessions, such as App*) may be selectively cached to decrease the call setup times by more quickly bringing up the GBR QoS bearer during an RRC Idle-to-Connected transition. The embodiments described below are applicable to LTE networks, W-CDMA networks, or both. One example of the type of application for which the selective caching procedure can be used is a media service that requires 'Always On" GBR QoS bearer logical connections (e.g., S5 connections in LTE as shown in FIG. 2D, Iu-ps data connections in W-CDMA as shown in FIGS. 2B-2C, etc.). Even though the S5 Connections are not truly 'Always On' in this embodiment, the selective caching procedure can decrease the setup times for the GBR QoS bearer to an extent that the call setup requirements of the delay-sensitive application (i.e., App*) are still satisfied (i.e., normally, these call setup requirements would only be satisfied via the relatively wasteful 'Always On' status of the GBR QoS bearer). Thus, the embodiments described below can, in certain scenarios, help to reduce the GBR QoS bearer setup delays during a call setup, and can also help to reduce the period for which media traffic is sent on a non-GBR bearer (e.g., a best effort bearer) during a call (e.g., by setting up the GBR QoS bearer more quickly, less time is spent exchanging traffic over a non-GBR QoS bearer).

Figure 5:
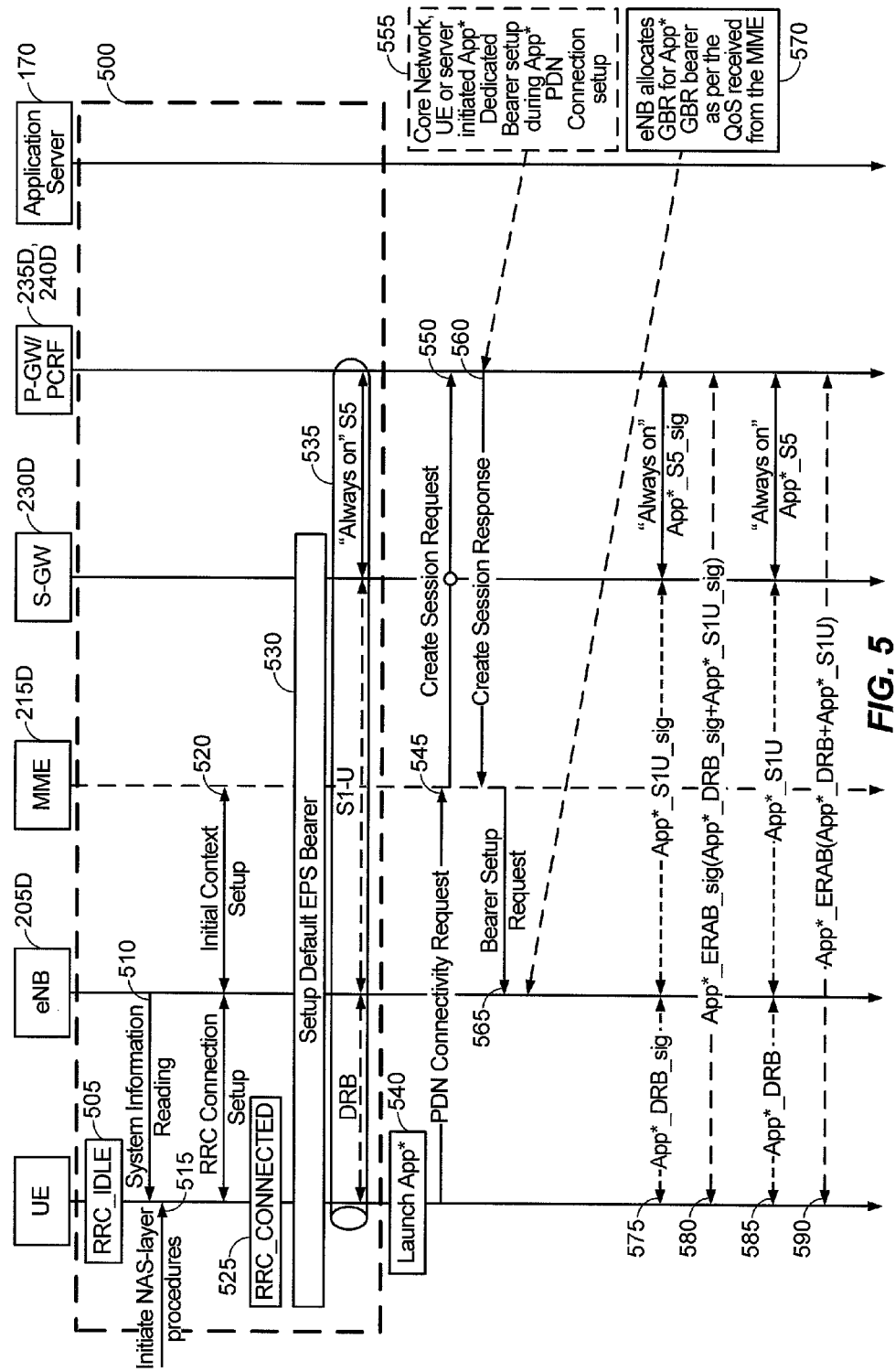
FIG. 5 illustrates an 'Always On' Quality of Service (QoS) setup procedure for a particular Guaranteed Bit Rate (GBR) EPS bearer.
Figure 6:
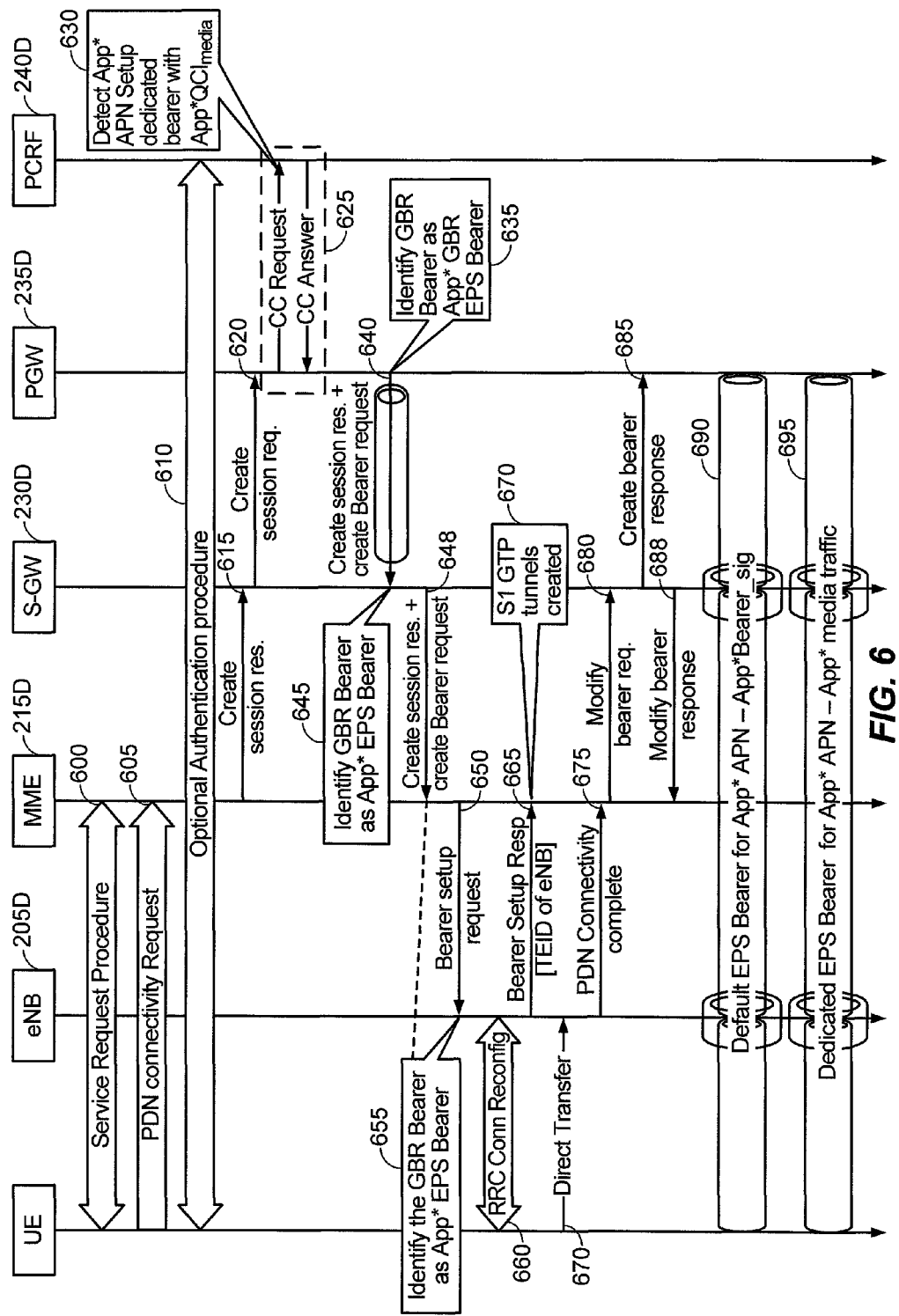
FIG. 6 shows how access point name (APN) information can be exchanged during a QoS setup procedure for a particular GBR EPS bearer that is not 'Always On' in accordance with an embodiment of the invention.

Below, FIG. 5 illustrates an 'Always On' QoS setup procedure for a particular GBR EPS bearer, and FIG. 6 shows how the APN information (or App* identifying information) can be exchanged during a QoS setup procedure for a particular GBR EPS bearer that is not 'Always On'. The App* identifying information exchanged as shown in FIG. 6 can be used to implement selective caching of QoS information (described below starting at FIG. 7) which decreases the setup time for the GBR QoS bearer so that the S5 connections can be released instead of being kept 'Always On' as in FIG. 5.

Referring to FIG. 5, 500 corresponds to an initial procedure whereby a given UE sets up a non-QoS EPS bearer. The setup of the non-QoS EPS bearer begins with the given UE in an RRC-Idle state, 505, after which a System Information reading operation is performed, 510, the Non-Access Stratum (NAS) layer at the given UE initiates EPS attach and PDN connectivity procedures, 515, the given UE and the LTE core network 140 engage in an RRC connection and context set-up procedure, 520, after which the given UE is transitioned into the RRC-Connected state, 525. At this point, a default EPS bearer (or non-GBR QoS EPS bearer) is established for the given UE, 530, and an 'Always On' S5 connection is set-up for the default EPS bearer, 535. The default EPS bearer can be used to support applications that exchange data for which QoS (e.g., GBR, etc.) is not required, such as web-browsing applications, Email applications, and so on.

The remainder of FIG. 5 describes setup of a GBR EPS bearer for a high-priority GBR application, which is denoted as App*. For LTE networks, App* can correspond to any application that requires GBR QoS on an associated EPS media bearer for supporting its communication sessions (e.g., PTT sessions, VoIP sessions, etc.) and that uses a dedicated Access Point Name (APN), where the dedicated APN is configured to specifically identify App* to external devices, such as components of the LTE core network 140. In non-LTE networks, App* can be supported on other types of QoS bearers.

Accordingly, after 535, the given UE launches App*, 540, sends a PDN Connectivity Request for App* to the MME 215D, 545, and the MME 215D sends a Create Session Request to the P-GW/PCRF 235D/240D, 550. At this point, the LTE core network 140 can initiate set-up of the dedicated bearer for App*'s PDN connection, or alternatively the application server 170 or UE request the dedicated GBR EPS bearer setup, 555. In either case, the P-GW/PCRF 235D/240D sends a Create Session Response message to the MME 215D which sets up the GBR EPS bearer with a GBR that is specific to App* (e.g., a nominal data rate such as 1 kpbs, or $X_{App}$* kpbs), 560. The MME 215D then delivers a Bearer Setup Request message to the eNodeB 215D to set-up the App*-specific GBR, 565, and the eNodeB 215D allocates the GBR for App*'s GBR EPS bearer as requested, 570. App*'s signaling bearer is setup, 575 and 580, and App*'s GBR EPS media bearer is also setup, 585 and 590.

Turning to App* in more detail, App*'s media traffic model can be configured differently than the typical VoIP application traffic. For example, App* can be configured to bundle at least one (e.g., 6) Vocoder frames into a single RTP packet and to transmit media packets every 120 ms. Thus, the data rate and air interface configurations required for the App* media bearer can be different than a VoIP media bearer, which is referenced as QCI '1' in LTE networks. So, it may not be suitable to use QCI '1' (conversational voice) for App*.

The LTE standard can reserve a QCI in the range 128-255 for certain multimedia applications (e.g., PTT applications), and can allocate GBR QoS for this QCI. The S-GW 230D and P-GW 235D can identify App*'s GBR EPS bearer during initial bearer setup or bearer setup due to x2 or S1 based handover based on the reserved QCI for App* ("App*QCI", for signaling and/or media), or alternatively based upon QCI '1' where the GBR EPS bearer is associated with an APN that is known to be related to App* (so the LTE core network knows to use App*'s specialized QoS parameters instead of the typical QCI '1' QoS parameters). As will be described in more detail with respect to later embodiments, the recognition of the App*-specific GBR EPS bearer can be used to prompt the MME 215D to identify App*'s GBR EPS bearer and to selectively cache the GBR parameters for the GBR EPS bearer during handover (e.g., the MME 215D may selectively cache GBR parameters associated with particular APNs, etc.). The eNodeB 205D can identify App*'s GBR EPS bearer during initial bearer setup bearer setup due to x2 or S1 based handover based on the reserved App*QCI to provide the requested QoS treatment. This procedure is shown in FIG. 6.

Referring to FIG. 6, the given UE, the eNodeB 205D and the MME 215D perform a service request procedure, 600, and the given UE delivers a PDN connectivity request for App* to the MME 215D, 605. Optionally, an authentication procedure can be performed for the given UE with the PCRF 240D, 610. The MME 215D delivers a Create Session Request to the S-GW 230D for App*, 615, and the S-GW 230D delivers a Create Session Request to the P-GW 235D for App*, 620. The P-GW 235D and the PCRF 240D then engage in an IP CAN session, 625, during which the PCRF 240D detects the App* APN, and applies App*QCI$_{signaling}$ to the default bearer and initiates a dedicated bearer with App*QCI$_{media}$, 630.

Referring to FIG. 6, the P-GW 235D identifies the GBR EPS Bearer as an App* EPS Bearer based on App*QCI$_{media}$ and being associated with App*'s APN, 635. The P-GW 235D sends a Create Session Response+Create Bearer Request to the S-GW 230D that indicates App*QCI$_{media}$, 640. The S-GW 230D identifies the GBR EPS Bearer as an App* EPS Bearer based on App*QCI$_{media}$ and being associated with App*'s APN, 645. The S-GW 230D sends a Create Session Response+Create Bearer Request to the MME 215D that indicates App*QCI$_{media}$, 648, and the MME 215D in turn sends a PDN Connectivity Accept+ Dedicated Bearer Set Request message to the eNodeB 205D that indicates App*QCI$_{media}$, 650. The MME 215D and the eNodeB 205D identifies the GBR EPS Bearer as an App* EPS Bearer based on App*QCI$_{media}$, 655. The GBR EPS bearer for media is then setup with App*QCI$_{media}$, and the default EPS bearer for App*'s signaling is setup with App*QCI$_{signaling}$, as shown in the signaling between 660- 695, which will be readily understood by one of ordinary skill in the art familiar with QoS setup in LTE networks.

FIGS. 5-6 show how the GBR EPS media bearer can be established for a particular application type, such as App*. Once the GBR EPS media bearer is identified as being associated with the particular application type, the MME 215D can perform actions to support selective caching of information associated with the GBR EPS media bearer's S5 connections while the given UE is in RRC-Idle state to permit the GBR EPS media bearer to be more quickly re-established upon a subsequent transition of the given UE back to RRC-Connected state, as described below with respect to FIGS. 7A-8.

In particular, App* can use QCI '1' or alternatively an application-specific QCI (QCI$_{App}$*) for the GBR EPS media bearer on a dedicated App* PDN connection (App*$_{APN}$) that requires the S5 connection to be quickly established (i.e., delay sensitive) when the UE transitions from RRC-Idle state to RRC-Connected state. As will be described below with respect to FIGS. 7A-8, the quick setup of the GBR EPS media bearer can be achieved without maintaining the GBR EPS media bearer as 'Always On' when during the UE is in RRC-Idle state based on a selective caching of information associated with the GBR EPS media bearer.

Conventionally, on transition to RRC-Idle state, the core network releases the GBR QoS bearers to conserve resources. Then, upon receiving a Service Request from the UE via eNodeB 205D due to the transition from RRC-Idle state to RRC-Connected state, the MME 215D only triggers the setup of the E-RABs for the active EPS bearers (i.e. Non-GBR EPS bearers and the GBR EPS bearers for which the S5 connections are in active state). As the MME 215D conventionally releases the S5 connections for GBR EPS bearers, the GBR bearers will not be setup in response to the Service Request message. Rather, the GBR bearers will only be setup when an application on the UE or the application server 170 requests for the GBR bearer explicitly for a call. This introduces delays in the GBR EPS media bearer setup and media may be transmitted on non-GBR bearer till GBR bearer is setup, resulting in degraded performance for App* initial media talk spurts in a loaded network.

Figure 7A:
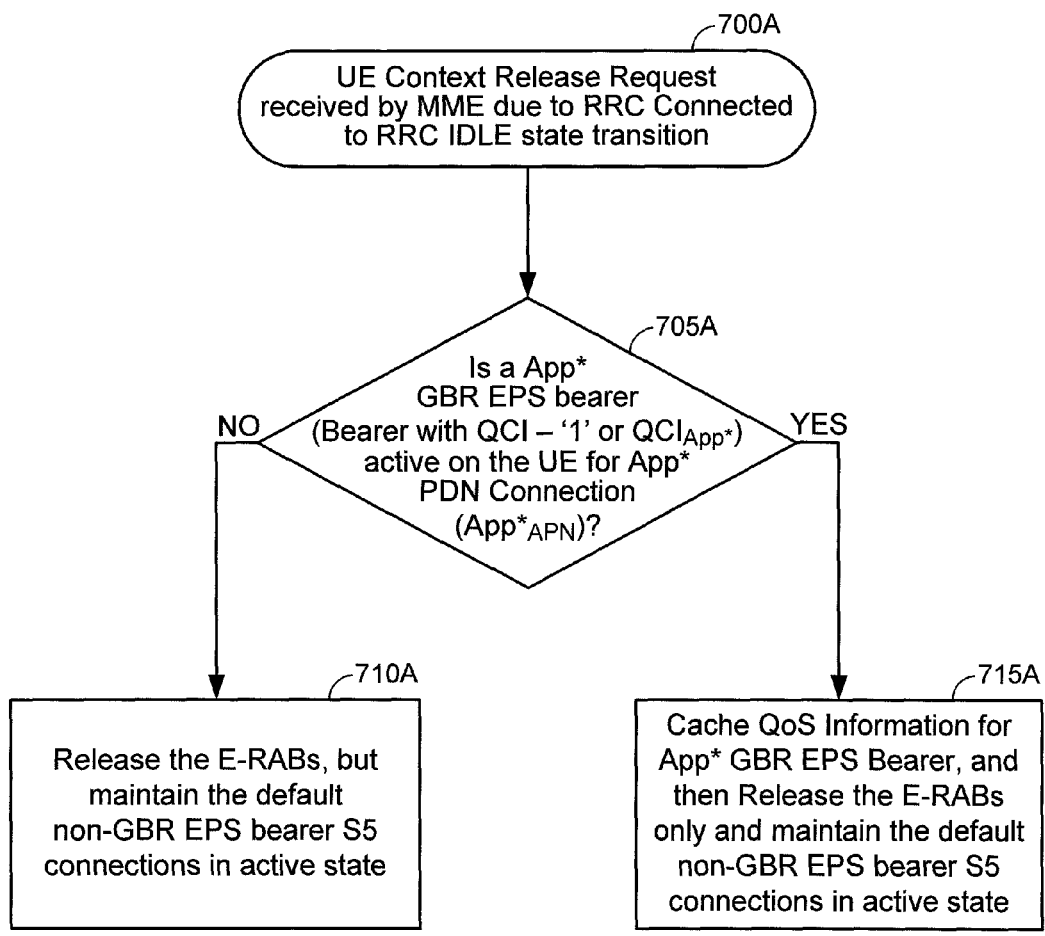
FIG. 7A illustrates a selective QoS caching procedure for an application-specific GBR EPS bearer in accordance with an embodiment of the invention.

Referring to FIG. 7A, after determining that a particular GBR EPS media bearer is associated with App* (e.g., as in 655 of FIG. 6), the MME 215D detects that the given UE transitions from RRC-Connected state to RRC-Idle state based on receipt of a UE Context Release request, 700A. In response to detection of the RRC-Idle transition, the MME 215B determines whether the App*'s GBR EPS media bearer is active for App*'s PDN connection (App*$_{APN}$), 705A. If not, the MME 215D releases the E-RABs but maintains the default non-GBR EPS bearer S5 connections in an active state (e.g., such as App*'s non-GBR EPS signaling bearer), 710A. Otherwise, the MME 215D caches the QoS information of App*'s GBR EPS bearer corresponding to the App* PDN connection and maintains this state information for the given UE even in RRC IDLE state, 715A. For example, the MME 215D can cache Bearer QCI (QCI$_{App}$* or QCI '1', APN of the App* PDN connection (App*$_{APN}$), GBR UL/DL—'X' kbps, MBR UL/DL, etc.). In 715A, the MME 215D then initiates the release of App*'s GBR EPS media bearer, which in turn causes the S-GW 230D and P-GW 235D to release the S5 connection for the GBR EPS media bearer. Thus, after the QoS information caching of 715A, the E-RABs are released while the default non-GBR EPS bearer S5 connections are maintained in an active state (e.g., such as App*'s non-GBR EPS signaling bearer).

Figure 7B:
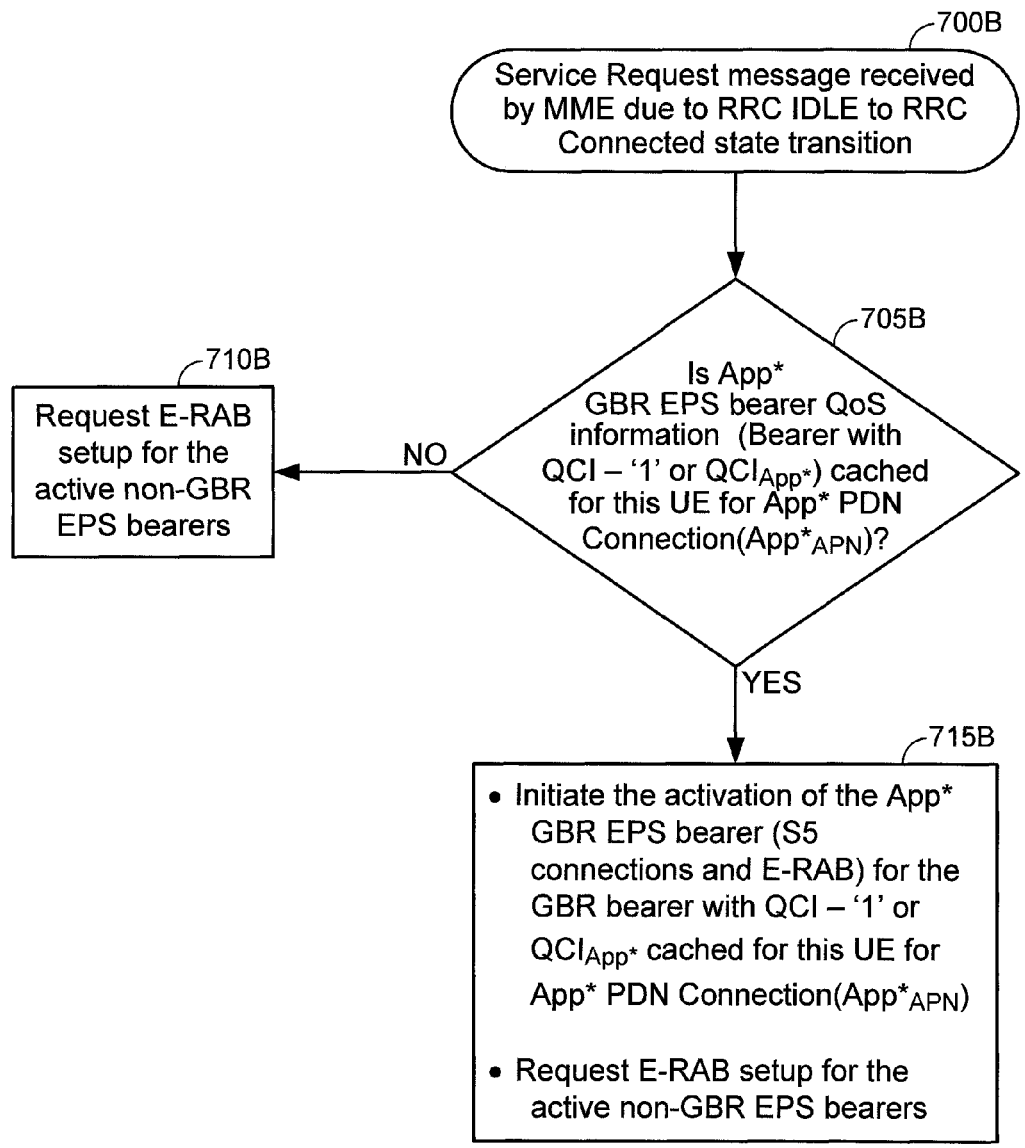
FIG. 7B illustrates a process of selectively activating cached QoS information for an application-specific GBR EPS bearer in accordance with an embodiment of the invention.

Referring to FIG. 7B, after execution of the process of FIG. 7A, the MME 215D detects that the given UE transitions from RRC-Idle state to back to RRC-Connected state based on receipt of a Service Request message, 700B. In response to detection of the RRC-Connected transition, the MME 215B determines whether QoS information associated with the App*'s GBR EPS media bearer is cached for the given UE's App*'s PDN connection (App*$_{APN}$), 705B. If not, the MME 215D requests E-RAB setup for the active non-GBR EPS bearers for the Service Request, 710B. Otherwise, the MME 215D initiates activation of App*'s GBR EPS bearer (S5 connection(s) and E-RAB) for QCI '1' or QCI$_{App}$* based on the cached QoS information for App*'s PDN connection (App*$_{APN}$), 715B. Also in 715B, the MME 215D requests E-RAB setup for the active non-GBR EPS bearers for the Service Request as in 710B.

FIG. 7C illustrates a network-side solution for re-establishing a GBR EPS media bearer associated with a particular application (App*) for the given UE in accordance with an embodiment of the invention. In particular, in FIG. 7C, assume that FIGS. 6 and 7A have already executed. The process of FIG. 7B is then performed during the process of FIG. 7C, as will be described below in more detail.

Referring to FIG. 7C, the given UE is in RRC-Idle state, 700C, and data activity is detected, 705C, that prompts the given UE to transition to RRC-Connected state, 710C and 715C. For example, the data activity detected at 705C can correspond to receipt of a page message indicating downlink data is available for transmission to the given UE, or alternatively can correspond to a determination to transmit uplink data from the given UE to the RAN 120. The data activity detected at 705C need not be related to App* itself, and can instead be related to any application associated with the given UE (even an application that does not use GBR on any of its bearers). The given UE then transmits a Service Request message to the eNodeB 205D, 720C, which is forwarded to the MME 215D, 725C. Receipt of the Service Request message by the MME 215D at 725C maps to 700B of FIG. 7B, in an example. Thus, the MME 715D determines that QoS information for the App* GBR EPS media bearer is cached, 730C (as in 705B), after which the MME 215B sets up the E-RABs for the Non-GBR EPS bearers with active S5 connections, 735C and 740C, and the MME 215B also facilitates setup of the GBR EPS media bearer based on the cached QoS information with the signaling shown in FIG. 7C between 745C and 765C.

While FIGS. 7A-7C are directed to an implementation whereby the MME 215D (i.e., a network-side entity) is responsible for caching the QoS information for App*'s GBR EPS media bearer, in another embodiment, the given UE itself can be responsible for maintaining the QoS information and then triggering the network to setup the GBR EPS media bearer using the QoS information, as will be described below with respect to FIG. 8. With respect to FIG. 8, assume that FIG. 6 has already executed, after which the given UE returns to RRC-Idle state from RRC-Connected state. Then, a variation of FIG. 7A is executed whereby the given UE (and not necessarily the MME 215D, although it is possible that FIG. 7A is still performed by the MME 215D) maintains the QoS information for App*'s GBR EPS media bearer.

Figure 8:
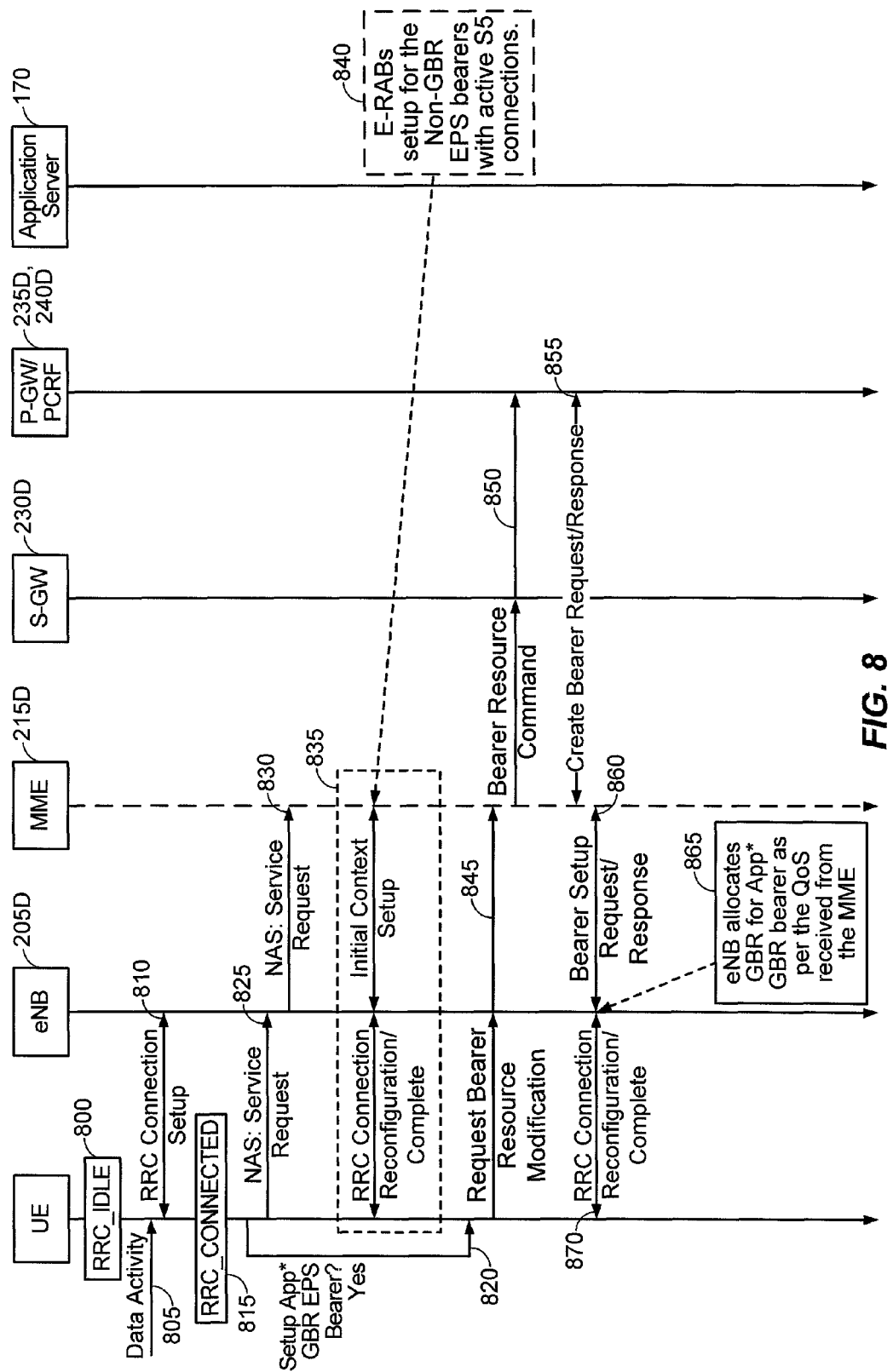
FIG. 8 illustrates a UE-side solution for re-establishing an application-specific GBR EPS media bearer in accordance with an embodiment of the invention.

With these assumptions, referring to FIG. 8, the given UE is in RRC-Idle state, 800. While the given UE is in RRC-Idle state, a client application for App* monitors the RRC state of the given UE, and eventually data activity is detected, 805, that prompts the given UE to transition to RRC-Connected state, 810 and 815. For example, the data activity detected at 805 can correspond to receipt of a page message indicating downlink data is available for transmission to the given UE, or alternatively can correspond to a determination to transmit uplink data from the given UE to the RAN 120. The data activity detected at 805 need not be related to App* itself, and can instead be related to any application associated with the given UE (even an application that does not use GBR on any of its bearers).

When the App* client application detects the given UE's transition from RRC-Idle state to RRC-Connected state, the App* client application determines to setup the App* GBR EPS media bearer. In this case, the App* GBR EPS media bearer is cached, 820 (similar to 705B, but at the UE instead of MME 215D and the UE does not need to actually cache the QoS information for the App* GBR EPS media bearer in a separate storage location because the bearer state for the App* GBR EPS media bearer can simply be maintained by the App* client application during RRC-Idle state). The given UE transmits a Service Request message to the eNodeB 205D, 825, which is forwarded to the MME 215D, 825, which prompts the MME 215B to setup the E-RABs for the Non-GBR EPS bearers with active S5 connections, 835 and 840. The App* client application instructs lower layers of the given UE to transmit a Request Bearer Resource Modification message to bring up the App* GBR EPS media bearer, which causes the given UE to transmit the Request Bearer Resource Modification message including the QoS parameters (e.g., QCI$_{App}$* or QCI '1') for the App* GBR EPS media bearer to the eNodeB 205D, which forwards the Request Bearer Resource Modification message with the QoS parameters to the MME 215D, 845. At this point, the MME 215D is aware of the QoS parameter to be setup for App*'s GBR EPS media bearer. Thus, in FIG. 7C, the MME 215D becomes aware of the QoS parameters via its own caching of the QoS information, and in FIG. 8 the MME 215D becomes aware of the cache QoS parameters via messaging from the given UE. Irrespective of whether the MME 215D is notified of the QoS parameters by its own caching (FIG. 7C) or a UE-based notification (FIG. 8), the MME 215D can facilitate setup of the GBR EPS media bearer based on the cached QoS information with the signaling shown in FIG. 8 at 850-870, which is the same as the signaling shown in FIG. 7C between 745C and 765C, respectively.

Conventionally, on transition from an Idle state (no TCH) to a Connected state (TCH active state) in LTE or W-CDMA networks, the air interface resources for the App* GBR QoS bearers are setup and reserved at the RAN for each active QoS bearer logical connection irrespective of whether or not there is traffic on the GBR QoS bearer. QoS is allocated/reserved for the entire time the UE is in Connected state (i.e., when the UE is in RRC-Connected state in LTE, or CELL_DCH state in W-CDMA). On smart phones, UEs can move between Idle state and Connected state very often due to the constant sync with servers by associated with social networking, email, and other applications Reserving App* GBR QoS resources for the GBR bearers without any traffic transmitted on those bearers results is inefficient usage of the network resources. For example, reserving App* GBR QoS resources for the GBR bearers without any traffic transmitted on those bearers reduces the capacity of the system (as the RAN 120 reserves the data rate required for GBR bearers (which are effectively inactive) and performs admission control for the new GBR bearers based on the remaining data rate allowed in the system). Also, reserving App* GBR QoS resources for the GBR bearers without any traffic transmitted on those bearers can impact the Best Effort (BE) traffic performance (i.e., the performance on a non-GBR bearer). As will be appreciated, these problems may be less applicable to EV-DO networks, as the air interface QoS resources are (de)allocated explicitly based on the (de)activation request from the application for the specific QoS flows or specific triggers at the RAN 120 and not on Idle-to-Connected state transitions for the flows configured with ReservationKKIdleStateFwd, ReservationKKIdleStateRev set to 0x01. Thus, the processes described below with respect to FIGS. 9A-10 focus upon LTE and W-CDMA implementations that address one or more of the above-noted problems.

Figure 9A:
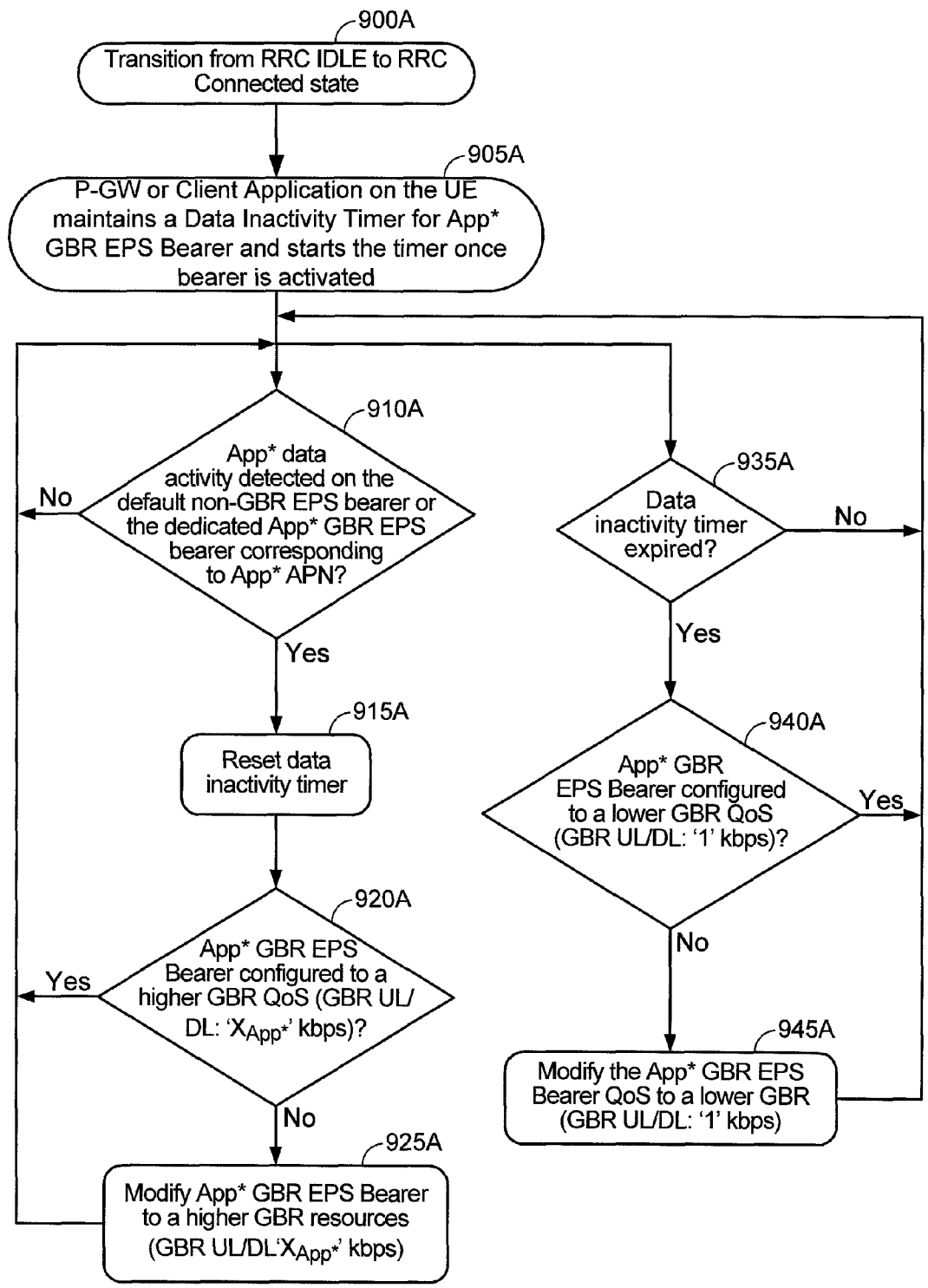
FIG. 9A is directed to a process of adjusting GBR QoS based on traffic inactivity for a UE in RRC-Connected state in an LTE network in accordance with an embodiment of the invention.
Figure 9B:
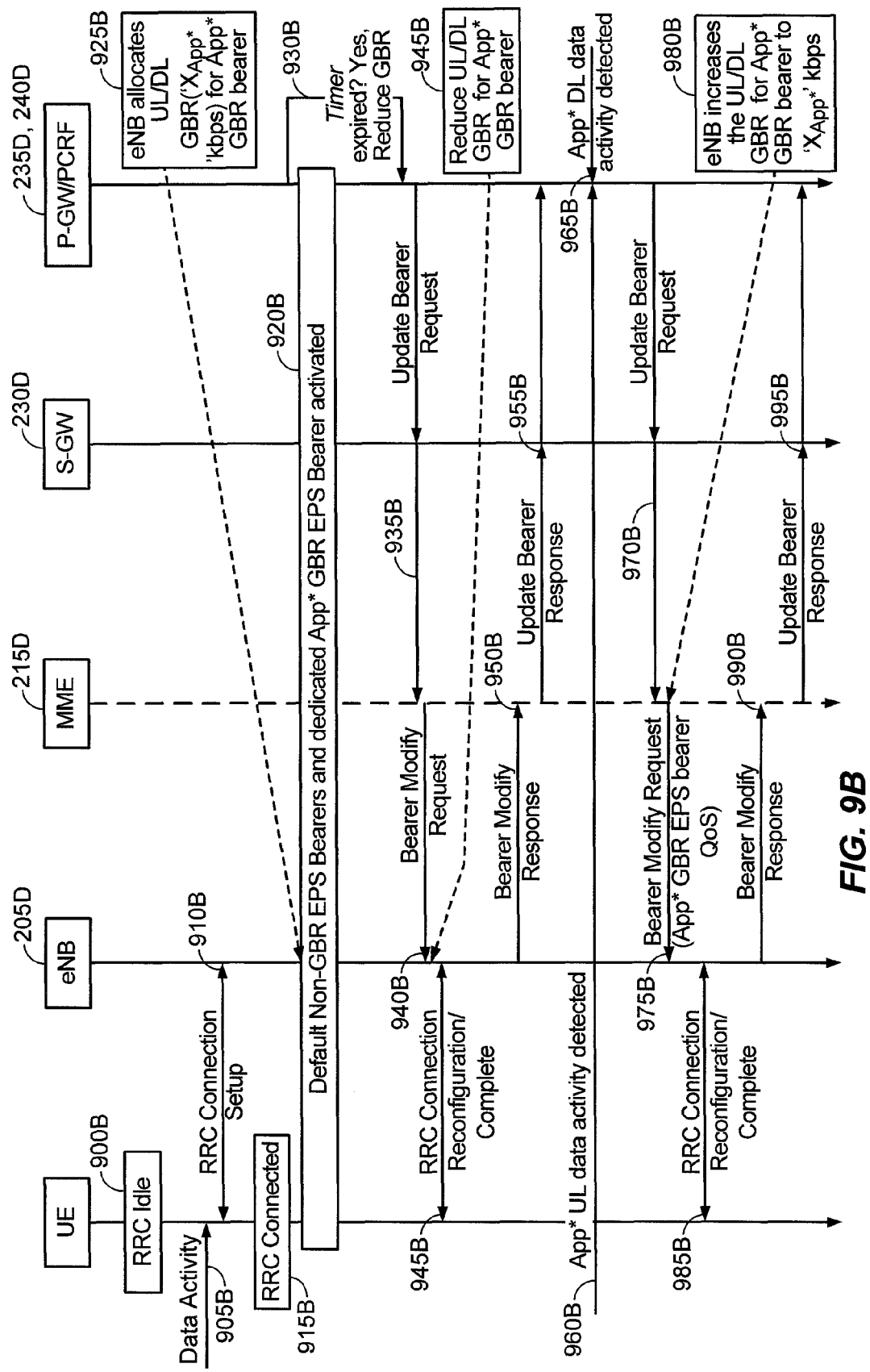
FIG. 9B illustrates the process of FIG. 9A implemented as a network-side solution at a P-GW in accordance with an embodiment of the invention.
Figure 9C:
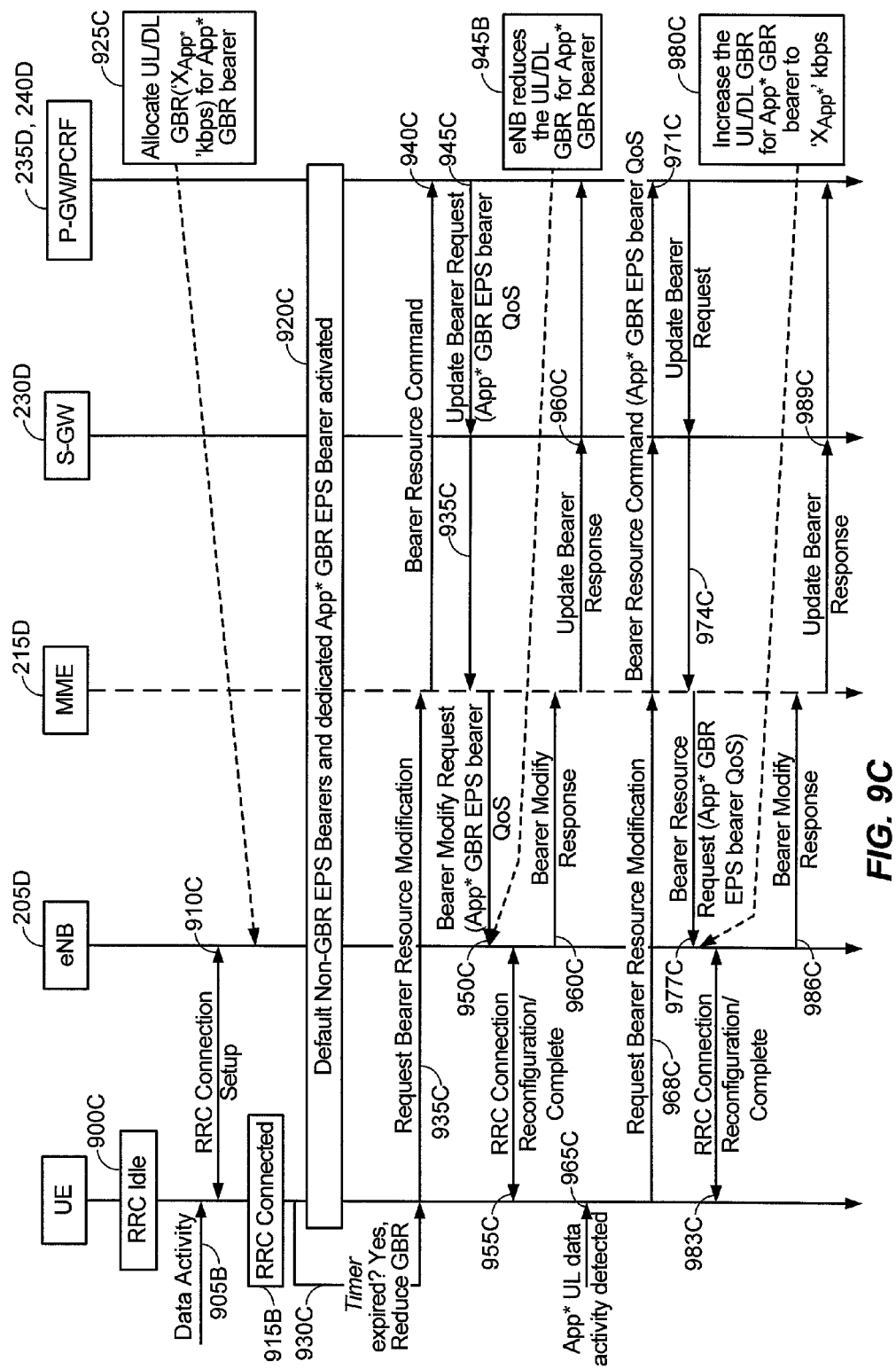
FIG. 9C illustrates the process of FIG. 9A implemented as a UE-side solution at a UE in accordance with an embodiment of the invention.

FIG. 9A is directed to a process of adjusting GBR QoS based on traffic inactivity for a given UE in RRC-Connected state in an LTE network in accordance with an embodiment of the invention. The process of FIG. 9A can be performed at the given UE, or alternatively at an LTE core network component such as the P-GW 235D from FIG. 2D. FIG. 9B illustrates the process of FIG. 9A implemented as a network-side solution at the P-GW 235D, while FIG. 9C illustrates the process of FIG. 9A implemented as a UE-side solution at the given UE.

Referring to FIG. 9A, a communications device (e.g., the given UE itself or the P-GW 235D) detects that the given UE transitions from RRC-Idle state to RRC-Connected state, 900A. In response to the RRC-Idle to RRC-Connected detection of 900A, the communications device starts a data inactivity timer with a given expiration period when the App* GBR EPS media bearer is activated, 905A. The data inactivity timer can correspond to a single data inactivity timer that monitors both uplink (UL) and downlink (DL) traffic on the GBR EPS media bearer, or alternatively the data inactivity timer can be implemented as two separate data inactivity timers that each monitor UL-specific or DL-specific traffic. For convenience of explanation, FIG. 9A is described below as if a single data inactivity timer is used, although the dual timer approach could be implemented in an alternative embodiment (with UL and DL QoS being independently controlled by their respective timers).

At 910A, the communications device determines whether UL or DL traffic is detected on the App* default non-GBR EPS bearer (e.g., the signaling bearer) or the App* GBR EPS media bearer, 910A. In particular, the communications device determines whether traffic associated with any bearer corresponding to App*'s APN is detected in the UL or DL direction at 805. If traffic is detected by the communications device on either App* bearer at 910A, the data inactivity timer is reset, 915A. At 920A, the communications device determines whether a threshold GBR (e.g., $X_{App}$* kpbs) is already setup for the GBR EPS media bearer, 920A. If not, the communications device increases the GBR (e.g., to X kpbs, where X may be an application-specific dynamic data rate for sessions associated with App*), 925A.

Referring to FIG. 9A, the communications device monitors the data inactivity timer to determine whether the data inactivity timer expires, 935A. If expiration is detected at 925A, the communications device determines whether a threshold GBR (e.g., $X_{App}$* kpbs) is already setup for the GBR EPS media bearer, 940A. If so, the communications device decreases the GBR (e.g., to 1 kpbs or some other nominal level) for the GBR EPS media bearer, 945A.

FIG. 9B illustrates the process of FIG. 9A implemented as a network-side solution at the P-GW 235D in accordance with an embodiment of the invention. Referring to FIG. 9B, the given UE is in RRC-Idle state, 900B, and data activity is detected, 905B, that prompts the given UE to transition to RRC-Connected state, 910B and 915B. For example, the data activity detected at 905B can correspond to receipt of a page message indicating downlink data is available for transmission to the given UE, or alternatively can correspond to a determination to transmit uplink data from the given UE to the RAN 120. The data activity detected at 905B need not be related to App* itself, and can instead be related to any application associated with the given UE (even an application that does not use GBR on any of its bearers).

At this point, the App* non-GBR EPS bearer (e.g., the signaling bearer) and the App* GBR EPS bearer (e.g., the media bearer) are set up, 920B, with the eNodeB 205D allocating $X_{App}$* kpbs GBR to the App* GBR EPS media bearer, 925B. At 930B, the P-GW/PCRF 235D/245D starts the data inactivity timer and eventually determines the data inactivity timer to have expired due to inactivity (as in 905A and 935A of FIG. 9A). Accordingly, GBR EPS media bearer is reduced from $X_{App}$* to 1 kpbs (or some other nominal GBR) via the signaling shown between 935B and 955B.

At some later point in time, assume that App* UL data activity, 960B, and/or App* DL data activity, 965B, is detected for the App* GBR EPS media bearer by the P-GW/PCRF 235D/245D. The detection of 960B and/or 965B corresponds to 910A, such that the P-GW/PCRF 235D/245D resets the data activity timer for the App* GBR EPS media bearer (as in 915A of FIG. 9A), after which the GBR EPS media bearer is increased from 1 kpbs to $X_{App}$* via the signaling shown between 970B and 995B (as in 925A of FIG. 9A).

FIG. 9C illustrates the process of FIG. 9A implemented as a UE-side solution at the given UE in accordance with an embodiment of the invention. Referring to FIG. 9C, the given UE is in RRC-Idle state, 900C, and data activity is detected, 905C, that prompts the given UE to transition to RRC-Connected state, 910C and 915C. For example, the data activity detected at 905C can correspond to receipt of a page message indicating downlink data is available for transmission to the given UE, or alternatively can correspond to a determination to transmit uplink data from the given UE to the RAN 120. The data activity detected at 905C need not be related to App* itself, and can instead be related to any application associated with the given UE (even an application that does not use GBR on any of its bearers).

At this point, the App* non-GBR EPS bearer (e.g., the signaling bearer) and the App* GBR EPS bearer (e.g., the media bearer) are set up, 920C, with the eNodeB 205D allocating $X_{App}$* kpbs GBR to the App* GBR EPS media bearer, 925C. At 930C, the App* client application on the given UE starts the data inactivity timer and eventually determines the data inactivity timer to have expired due to inactivity (as in 905A and 935A of FIG. 9A). Accordingly, the App* client application requests that the GBR EPS media bearer be reduced from $X_{App}$* to 1 kpbs (or some other nominal GBR) via the signaling shown between 935C and 960C.

At some later point in time, assume that the App* client application on the given UE detects UL or DL App* data activity, 960C for the App* GBR EPS media bearer, 965C. The detection of 965C corresponds to 910A, such that the App* client application on the given UE resets the data activity timer for the App* GBR EPS media bearer (as in 915A of FIG. 9A), after which the App* client application requests that the GBR EPS media bearer be increased from 1 kpbs to $X_{App}$* via the signaling shown between 968C and 989C (as in 925A of FIG. 9A).

Figure 10:
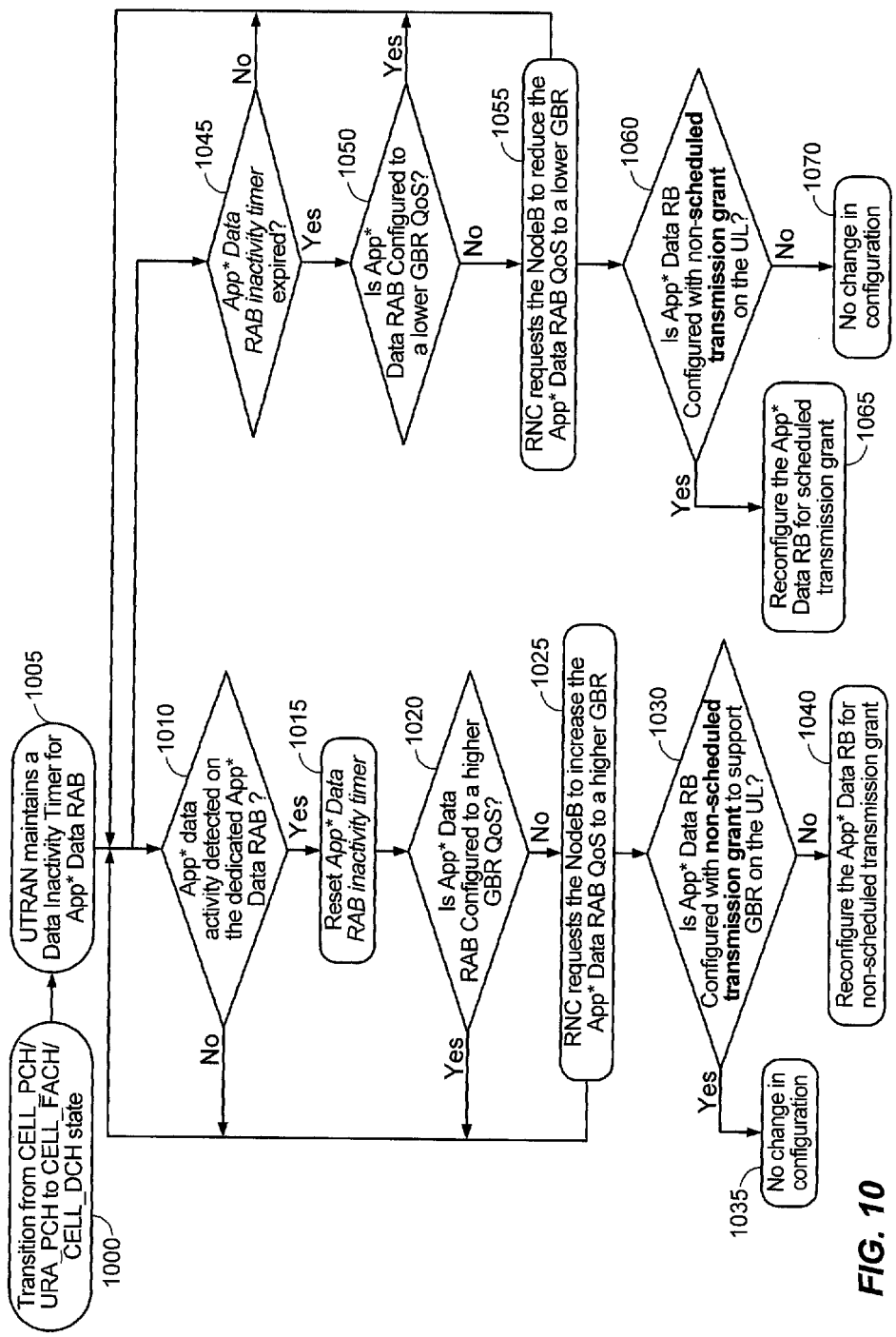
FIG. 10 is directed to a process of adjusting GBR QoS based on traffic inactivity for a UE in an active state in a W-CDMA network in accordance with an embodiment of the invention.

While FIGS. 9A-9C are directed to processes of adjusting GBR QoS based on traffic inactivity for a given UE in RRC-Connected state in an LTE network, FIG. 10 is directed to a process of adjusting GBR QoS based on traffic inactivity for a given UE in an active state (e.g., CELL_FACH or CELL_DCH) in a W-CDMA network in accordance with an embodiment of the invention. The process of FIG. 10 can be performed by a RAN component, such as the RNC 215B from FIGS. 2B-2C.

Referring to FIG. 10, the RAN 120 detects that the given UE transitions from an idle state (e.g., CELL_PCH or URA_PCH) to an active state (e.g., CELL_FACH or CELL_DCH), 1000. In response to the active state transition detection of 1000, the RAN 120 starts a data inactivity timer with a given expiration period for a data RAB associated with App*, 1005. In an example, the App* data RAB can be configured with the "Interactive" traffic class, signaling indication ("Yes") and ARP attributes, or alternatively can be configured with the "Conversational" traffic class whereby the RAN 120 reconfigures the QoS parameters of that class. The data inactivity timer can correspond to a single data inactivity timer that monitors both uplink (UL) and downlink (DL) traffic on the GBR EPS media bearer, or alternatively the data inactivity timer can be implemented as two separate data inactivity timers that each monitor UL-specific or DL-specific traffic. For convenience of explanation, FIG. 10 is described below as if a single data inactivity timer is used, although the dual timer approach could be implemented in an alternative embodiment (with UL and DL QoS being independently controlled by their respective timers).

At 1010, the RAN 120 determines whether UL or DL traffic is detected on the App* data RAB. If traffic is detected by the RAN 120 on the App* data RAB at 1010, the data inactivity timer is reset, 1015. At 1020, the RAN 120 determines whether a threshold GBR (e.g., $X_{App}*$ kpbs) is already setup for the App* data RAB, 1020. For example, at 1020, the RAN 120 can check whether MAC-es/MAC-hs GBR is set to $X_{App}*$ kpbs on the UL and/or DL of the App* data RAB. If not, the RNC 215B requests the serving Node B(s) within the RAN 120 to increase the GBR (e.g., to $X_{App}*$ kpbs) in the UL and/or DL directions for 1025. Also, if the RAN 120 determines that data traffic is detected on the App* data RAB, the serving Node B checks whether the App* data RAB is configured with non-scheduled transmission grant to support GBR on the UL, 1030. If so, no further action is necessary for setting up the GBR at the serving Node B for the App* data RAB, 1035. If not, the serving Node B reconfigures the App* data RAB for non-scheduled transmission grant on the UL, 1040.

Referring to FIG. 10, the RAN 120 monitors the data inactivity timer to determine whether the data inactivity timer expires, 1045. If expiration is detected at 1045, the RAN 120 determines whether a threshold GBR (e.g., $X_{App}*$ kpbs) is already setup for the App* data RAB, 1050. For example, at 1050, the RAN 120 can check whether MAC-es/MAC-hs GBR is set to $X_{App}*$ kpbs on the UL and/or DL of the App* data RAB. If so, the RAN 120 decreases the GBR (e.g., to 1 kpbs or some other nominal level) for the App* data RAB, 1055. Also, if the RAN 120 determines expiration of the data inactivity timer, the serving Node B checks whether the App* data RAB is configured with non-scheduled transmission grant to support GBR on the UL, 1060. If so, the serving Node B reconfigures the App* data RAB for scheduled transmission grant on the UL, 1065. If not, no further action is necessary for releasing the GBR at the serving Node B for the App* data RAB, 1070.

Figure 11:
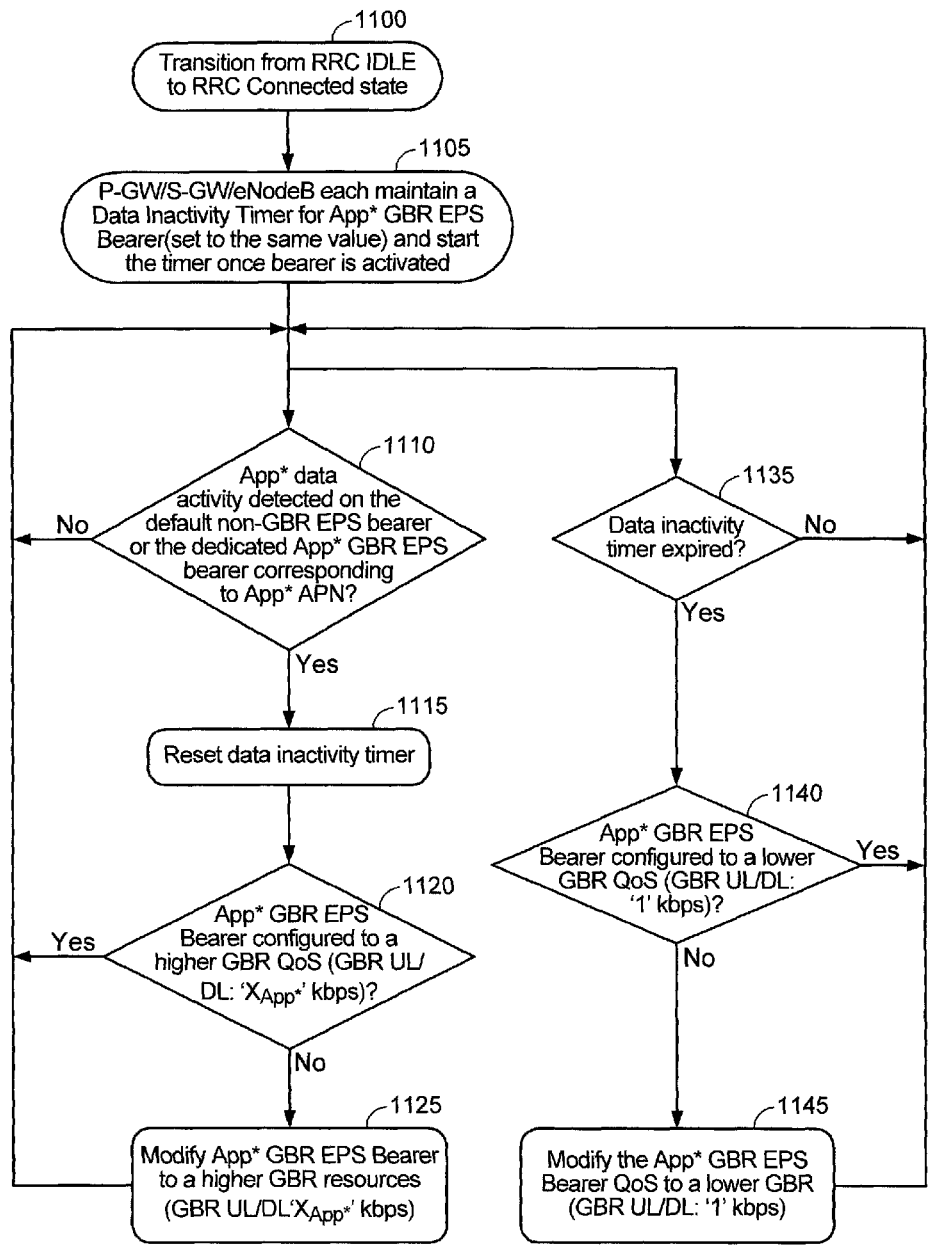
FIG. 11 illustrates a process of changing an application-specific GBR QoS allocation locally (or independently) at each LTE network component based on data inactivity while the given UE is in RRC-Connected state in accordance with an embodiment of the invention.

FIG. 11 illustrates a process of changing the App* GBR QoS allocation locally (or independently) at each LTE network component based on data inactivity while the given UE is in RRC-Connected state in accordance with an embodiment of the invention. Generally, FIG. 11 is substantially similar to FIG. 9A, except that FIG. 9A executed at a single LTE core component (i.e., the P-GW 235D) with the expectation that the single LTE core component performing FIG. 9A facilitates the QoS setup or teardown based on the traffic inactivity timer(s) at other LTE components via signaling (e.g., the S-GW 230D, the eNodeB 205D, etc.). In other words, in FIG. 9A, centralized timer(s) at the single LTE core component control the QoS allocations at other LTE components. FIG. 11, on the other hand, relates to a parallel execution of FIG. 9A at multiple LTE components such that the above-noted signaling can be skipped, such that each LTE component can independently or unilaterally make QoS decisions based on its own traffic inactivity timer(s). In particular, FIG. 11 is configured for execution at multiple LTE components, such as the serving eNodeB 205D, the S-GW 230D and the P-GW 235D. As will be appreciated, the mechanisms by which each LTE component detects the RRC-Idle to RRC-Connected transition of the given UE at 1100 may vary, and operations 1105 through 1145 execute in an independent manner at the serving eNodeB 205D, the S-GW 230D and the P-GW 235D, respectively. Aside from this aspects, 1100 through 1145 of FIG. 11 are substantially similar to 900A through 945A of FIG. 9A, respectively, and as such will not be discussed further for the sake of brevity.

Figure 12:
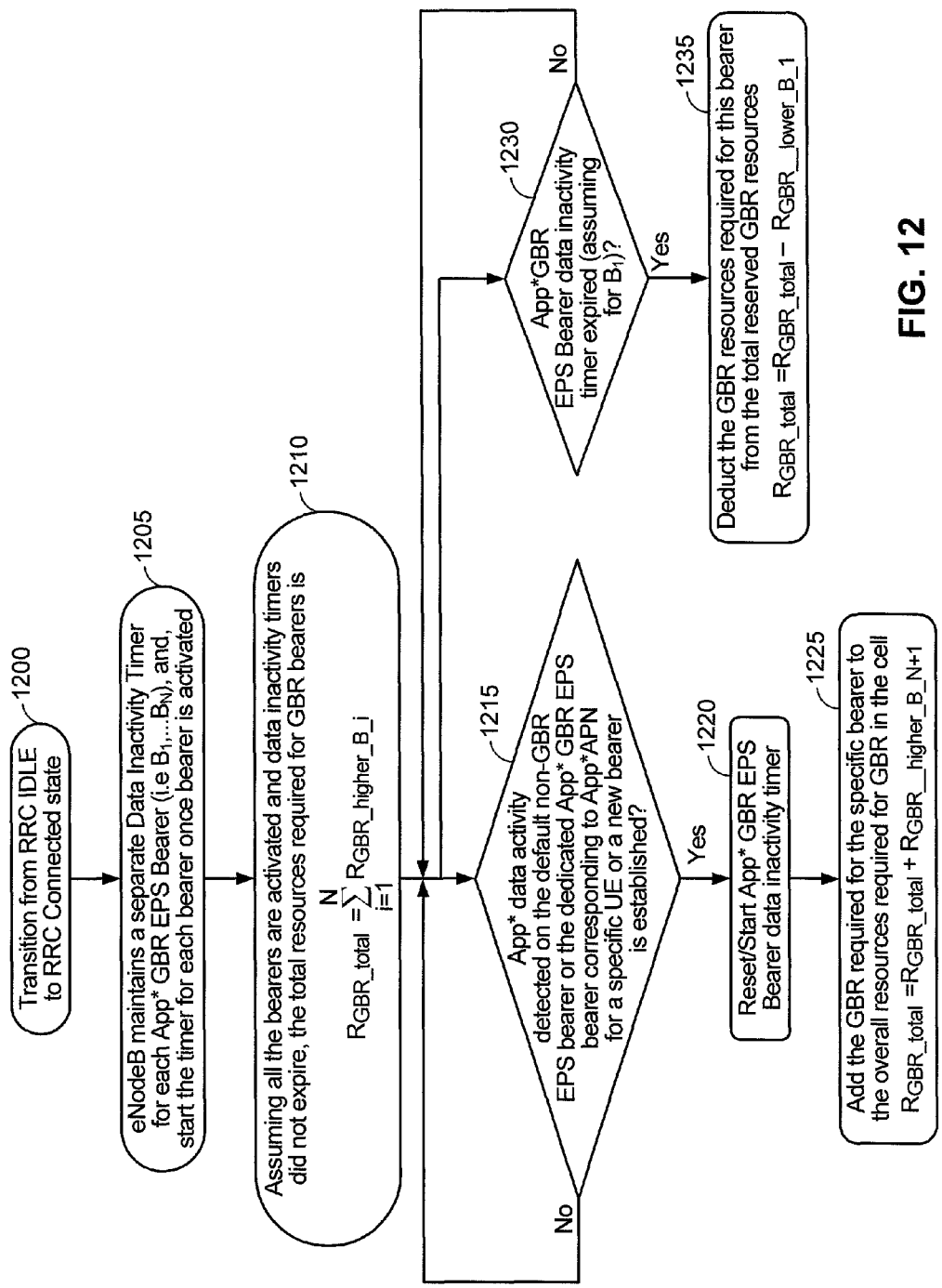
FIG. 12 is directed to a process of establishing GBR QoS reservations for application-specific EPS bearers at the RAN in an LTE network in accordance with an embodiment of the invention.

FIG. 12 is directed to a process of establishing GBR QoS reservations for application-specific EPS bearers (e.g., such as App* EPS bearers) at the RAN 120 in an LTE network in accordance with an embodiment of the invention. In FIG. 12, the serving eNodeB 205D can reserve the GBR resources specifically for bearers with activity, and, consider these bearers specifically (e.g., to the exclusion of bearers without recent activity) to determine the resources available in the system for admission control purposes.

Referring to FIG. 12, the RAN 120 (e.g., the serving eNodeB 205D) detects that the given UE transitions from RRC-Idle state to RRC-Connected state, 1200. In response to the RRC-Idle to RRC-Connected detection of 1200, the RAN 120 starts a separate data inactivity timer with a given expiration period for each App* GBR EPS media bearer (B1 . . . BN) when the respective bearer is activated, 1205. Assuming all the bearers are activated and data inactivity timers did not expire, the total resources required for GBR bearers may be calculated at 1210 based on Equation 1:

$$R_{GBR\_total} \Sigma_{i=0}^{n} R_{GBR\_higher\_B\_i} \qquad \text{Equation 1}$$

where $R_{GBR\_total}$ corresponds to the total GBR resources reserved in the eNodeB 205D, and $R_{GBR\_higher\_B\_i}$ corresponds to the actual GBR resources ($X_{App}*$ kbps) required for the $i_{th}$ bearer.

Referring to FIG. 12, the RAN 120 determines whether App* data activity is detected on the default non-GBR EPS bearer or the App* GBR EPS bearer corresponding to App* APN for a specific UE (e.g., activity detected on bearer $B_{N+1}$ which was inactive previously), or if a new bearer is established altogether, 1215. If either condition occurs, the RAN 120 starts (or resets) the data inactivity timer for the existing bearer with traffic activity (or the new bearer), 1220. The RAN 120 allocates GBR to the newly allocated (or reserved) GBR, denoted as $R_{GBR\_higher\_B}$, and then updates $R_{GBR\_total}$ by adding $R_{GBR\_higher\_B\_N+1}$, 1225, as follows:

$$R_{GBR\_total} = R_{GBR\_total} + R_{GBR\_higher\_B\_N+1} \qquad \text{Equation 2}$$

The RAN 120 also continually monitors the data inactivity timers for each allocated App* GBR bearer, 1230. If any of these data inactivity timers expire due to inactivity, the RAN 120 releases the GBR, denoted as RGBR_lower_B_1, from the bearer(s) associated with the expired timer(s), and the RAN 120 then updates RGBR_total by subtracting RGBR_lower_B_1, 1235, as follows:

$$R_{GBR\_total} = R_{GBR\_total} - R_{GBR\_lower\_B\_1} \qquad \text{Equation 3}$$

where $R_{GBR\_lower\_B\_i}$ corresponds to a lower threshold of GBR resources (e.g., '1' kbps) required for the $_i$th bearer traffic, used when the data inactivity timer expires.

While the embodiments above have been described primarily with reference to 1× EV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of selectively caching Quality of Service (QoS) data at an apparatus, comprising:
    detecting a first transition of a client device from an active state to an idle state while the client device is allocated a QoS link by a serving network;
    caching QoS information associated with the QoS link, wherein the cached QoS information includes one or more parameters of an interface between different core network components of the core network;
    releasing the QoS link in response to the detection of the first transition;
    detecting, after the caching and releasing, a second transition of the client device from the idle state back to the active state; and
    re-establishing, in response to the detection of the second transition and subsequent to the client device being in the active state, the QoS link using the cached QoS information.

2. The method of claim 1, wherein the initiating facilitates setup of one or more network interface connections for supporting QoS on the re-established QoS link using the cached QoS information.

3. The method of claim 2,
    wherein the serving network is a Long Term Evolution (LTE) network, and
    wherein the one or more network interface connections include one or more Radio Access Bearer connections, and, wherein the interface between the different core network components of the core network includes one or more S5 connections.

4. The method of claim 1, wherein the cached QoS information includes:
a QoS Class Identifier (QCI) of the QoS link, and/or
an uplink guaranteed bit rate (GBR) of the QoS link, and/or
a downlink GBR of the QoS link.

5. The method of claim 4, wherein the QCI of the QoS link corresponds to an application-specific QCI that is associated with QoS links established for communication sessions of a given type.

6. The method of claim 5, wherein the communication sessions of the given type correspond to multimedia sessions arbitrated by a particular application server that is external to the serving network of the client device.

7. The method of claim 1, wherein the active state is RRC-Connected state and the idle state is RRC-Idle state.

8. The method of claim 1, wherein the apparatus corresponds to a mobility management entity (MME) of a Long Term Evolution (LTE) core network.

9. The method of claim 8, wherein the detection of the second transition corresponds to receipt of a Service Request message at the MME from the client device.

10. The method of claim 8, wherein the initiating includes sending a serving Node B of the client device a request to set-up the re-established QoS link with a level of QoS that is based upon the cached QoS information.

11. The method of claim 1, wherein the apparatus corresponds to an access network that is configured to serve the client device during a communication session by supporting a direct physical-layer connection to the client device.

12. The method of claim 1, wherein the QoS link corresponds to a Guaranteed Bit Rate (GBR) media link supporting a communication session for the client device before the first transition of the client device from the active state to the idle state.

13. The method of claim 1, wherein the releasing releases the QoS link while maintaining a set of network interface connections for supporting at least one non-QoS link allocated to the client device in response to the detection of the first transition, and wherein the set of network interface connections includes the interface between the different core network components of the core network.

14. The method of claim 13,
wherein the serving network is a Long Term Evolution (LTE) network, and
wherein the set of network interface connections include one or more Radio Access Bearer connections, and, wherein the interface between the different core network components of the core network includes one or more S5 connections at the LTE network.

15. The method of claim 1, further comprising:
monitoring, while the client device is in the active state, traffic usage in a downlink direction of the QoS link and/or the re-established QoS link;
monitoring, while the client device is in the active state, traffic usage in an uplink direction of the QoS link and/or the re-established QoS link; and
initiating (i) an uplink-specific QoS adjustment to a first level of QoS assigned to the uplink direction of the QoS link and/or the re-established QoS link based on the monitored traffic usage in the uplink direction, and/or (ii) a downlink-specific QoS adjustment to a second level of QoS assigned to the downlink direction of the QoS link and/or the re-established QoS link based on the monitored traffic usage in the downlink direction.

16. The method of claim 15, wherein the monitoring of the traffic usage in the downlink direction, the monitoring of the traffic usage in the uplink direction and the initiating are performed at the client device.

17. The method of claim 15, wherein the monitoring of the traffic usage in the downlink direction, the monitoring of the traffic usage in the uplink direction and the initiating are performed at a component of a Long Term Evolution (LTE) network that is serving the client device.

18. The method of claim 17, wherein the component is a Packet Data Network Gateway (P-GW).

19. The method of claim 15, wherein the monitoring of the traffic usage in the downlink direction, the monitoring of the traffic usage in the uplink direction and the initiating are performed based on the QoS link being associated with an application of a given type.

20. The method of claim 19, wherein the application of the given type is identified based at least in part upon an access point name (APN), such that the caching and the re-establishing are not performed for one or more other QoS links that are not associated with the APN.

21. The method of claim 15,
wherein the initiating of the uplink-specific QoS adjustment and/or the downlink-specific QoS adjustment initiates the uplink-specific QoS adjustment, and
wherein the uplink-specific QoS adjustment increases the QoS assigned to the uplink direction of the QoS link from the first level.

22. The method of claim 15,
wherein the initiating of the uplink-specific QoS adjustment and/or the downlink-specific QoS adjustment initiates the uplink-specific QoS adjustment, and
wherein the uplink-specific QoS adjustment decreases the QoS assigned to the uplink direction of the QoS link from the first level.

23. The method of claim 15,
wherein the initiating of the uplink-specific QoS adjustment and/or the downlink-specific QoS adjustment initiates the downlink-specific QoS adjustment, and
wherein the downlink-specific QoS adjustment increases the QoS assigned to the downlink direction of the QoS link from the second level.

24. The method of claim 15,
wherein the initiating of the uplink-specific QoS adjustment and/or the downlink-specific QoS adjustment initiates the downlink-specific QoS adjustment, and
wherein the downlink-specific QoS adjustment decreases the QoS assigned to the downlink direction of the QoS link from the second level.

25. The method of claim 1, wherein the caching and the initiating are performed based on the QoS link being associated with an application of a given type.

26. The method of claim 25, wherein the application of the given type is identified based at least in part upon an access point name (APN), such that the caching and the initiating are not performed for one or more other QoS links that are not associated with the APN.

27. The method of claim 1, wherein the detecting and the caching are performed independently at both a component of the serving network and the client device.

28. The method of claim 1, wherein the apparatus corresponds to a component of a Long Term Evolution (LTE) network that locally performs the caching and the initiating independent of QoS setup at any other entities of the LTE network.

29. The method of claim 28, wherein the component is an enhanced Node B (eNB) of the LTE network.

30. The method of claim 28, wherein the component is a Packet Data Network Gateway (P-GW) of the LTE network.

31. The method of claim 28, wherein the component is a Serving Gateway (S-GW) of the LTE network.

32. The method of claim 1, wherein the apparatus corresponds to a component of a Universal Mobile Telecommunications System (UMTS) network.

33. The method of claim 32, wherein the component of the UMTS network corresponds to a UMTS Terrestrial Radio Access Network (UTRAN).

34. The method of claim 1, further comprising:
monitoring, before the first transition and/or after the second transition while the client device is in the active state, traffic activity on each of multiple QoS links assigned to the client device;
managing, before the first transition and/or after the second transition while the client device is in the active state, an allocation of QoS to the multiple QoS links based on the monitoring by:
setting an amount of QoS allocated to any of the multiple QoS links with less than a threshold amount of traffic activity to a first QoS level without releasing the respective QoS link, and
setting an amount of QoS allocated to any of the multiple QoS links with more than the threshold amount of traffic to a second QoS level that is higher than the first QoS level, and
tracking an aggregate amount of QoS allocated to the client device.

35. An apparatus configured to selectively cache Quality of Service (QoS) data, comprising:
means for detecting a first transition of a client device from an active state to an idle state while the client device is allocated a QoS link by a serving network;
means for caching QoS information associated with the QoS link, wherein the cached QoS information includes one or more parameters of an interface between different core network components of the core network;
means for releasing the QoS link in response to the detection of the first transition;
means for detecting, after the caching and releasing, a second transition of the client device from the idle state back to the active state; and
means for re-establishing, in response to the detection of the second transition and subsequent to the client device being in the active state, the QoS link using the cached QoS information.

36. The apparatus of claim 35,
wherein the apparatus corresponds to a mobility management entity (MME), an enhanced Node B (eNB), a Packet Data Network Gateway (P-GW) or a Serving Gateway (S-GW) of a Long Term Evolution (LTE) network, or
wherein the apparatus corresponds to a component of a Universal Mobile Telecommunications System (UMTS) network.

37. An apparatus configured to selectively cache Quality of Service (QoS) data, comprising:
logic configured to detect a first transition of a client device from an active state to an idle state while the client device is allocated a QoS link by a serving network;
logic configured to cache QoS information associated with the QoS link, wherein the cached QoS information includes one or more parameters of an interface between different core network components of the core network;
logic configured to release the QoS link in response to the detection of the first transition;
logic configured to detect, after the caching and releasing, a second transition of the client device from the idle state back to the active state; and
logic configured to re-establish, in response to the detection of the second transition and subsequent to the client device being in the active state, the QoS link using the cached QoS information.

38. The apparatus of claim 37,
wherein the apparatus corresponds to a mobility management entity (MME), an enhanced Node B (eNB), a Packet Data Network Gateway (P-GW) or a Serving Gateway (S-GW) of a Long Term Evolution (LTE) network, or
wherein the apparatus corresponds to a component of a Universal Mobile Telecommunications System (UMTS) network.

39. A non-transitory computer-readable medium containing instructions stored thereon, which, when executed by an apparatus configured to selectively cache Quality of Service (QoS) data, cause the apparatus to perform operations, the instructions comprising:
at least one instruction configured to cause the apparatus to detect a first transition of a client device from an active state to an idle state while the client device is allocated a QoS link by a serving network;
at least one instruction configured to cause the apparatus to cache QoS information associated with the QoS link, wherein the cached QoS information includes one or more parameters of an interface between different core network components of the core network;
at least one instruction configured to cause the apparatus to release the QoS link in response to the detection of the first transition;
at least one instruction configured to cause the apparatus to detect, after the caching and releasing, a second transition of the client device from the idle state back to the active state; and
at least one instruction configured to cause the apparatus to re-establishing, in response to the detection of the second transition and subsequent to the client device being in the active state, the QoS link using the cached QoS information.

40. The non-transitory computer-readable medium of claim 39,
wherein the apparatus corresponds to a mobility management entity (MME), an enhanced Node B (eNB), a Packet Data Network Gateway (P-GW) or a Serving Gateway (S-GW) of a Long Term Evolution (LTE) network, or
wherein the apparatus corresponds to a component of a Universal Mobile Telecommunications System (UMTS) network.

* * * * *